(12) United States Patent
Sun

(10) Patent No.: US 11,177,471 B2
(45) Date of Patent: Nov. 16, 2021

(54) ANODE MATERIALS FOR LITHIUM ION BATTERIES AND METHODS OF MAKING AND USING SAME

(71) Applicant: JOHNSON MATTHEY PUBLIC COMPANY LIMITED, London (GB)

(72) Inventor: Fuxia Sun, Woodbury, MN (US)

(73) Assignee: JOHNSON MATTHEY PUBLIC COMPANY LIMITED, London (GB)

( * ) Notice: Subject to any disclaimer, the term of this patent is extended or adjusted under 35 U.S.C. 154(b) by 356 days.

(21) Appl. No.: 15/842,954

(22) Filed: Dec. 15, 2017

(65) Prior Publication Data

US 2018/0175390 A1 Jun. 21, 2018

Related U.S. Application Data

(60) Provisional application No. 62/435,240, filed on Dec. 16, 2016.

(51) Int. Cl.
| | |
|---|---|
| *H01M 4/36* | (2006.01) |
| *H01M 4/62* | (2006.01) |
| *H01M 10/0525* | (2010.01) |
| *H01M 4/134* | (2010.01) |
| *H01M 4/38* | (2006.01) |
| *C22C 24/00* | (2006.01) |
| *C22C 28/00* | (2006.01) |
| *H01M 4/02* | (2006.01) |

(52) U.S. Cl.
CPC ........... *H01M 4/366* (2013.01); *C22C 24/00* (2013.01); *C22C 28/00* (2013.01); *H01M 4/134* (2013.01); *H01M 4/386* (2013.01); *H01M 4/628* (2013.01); *H01M 10/0525* (2013.01); *H01M 4/621* (2013.01); *H01M 4/625* (2013.01); *H01M 2004/027* (2013.01)

(58) Field of Classification Search
CPC ...... H01M 4/366; H01M 4/386; H01M 4/134; H01M 4/628; H01M 4/621; H01M 4/625; H01M 2004/027; H01M 10/0525; C22C 24/00; C22C 28/00
See application file for complete search history.

(56) References Cited

U.S. PATENT DOCUMENTS

| | | | |
|---|---|---|---|
| 6,680,145 B2 | 1/2004 | Obrovac | |
| 7,906,238 B2 | 3/2011 | Le | |
| 8,071,238 B2 | 12/2011 | Le | |
| 8,257,864 B2 | 9/2012 | Dahn | |
| 8,753,545 B2 | 6/2014 | Obrovac | |
| 2003/0129494 A1* | 7/2003 | Kaneda | H01M 4/38 429/231.1 |
| 2008/0206641 A1 | 8/2008 | Christensen | |
| 2011/0086271 A1* | 4/2011 | Lee | H01M 4/366 429/220 |
| 2012/0028127 A1 | 2/2012 | Wei | |
| 2012/0202112 A1* | 8/2012 | Yushin | H01M 4/387 429/200 |
| 2014/0057176 A1 | 2/2014 | Park | |
| 2014/0127578 A1* | 5/2014 | Chung | H01M 4/366 429/217 |
| 2014/0261899 A1 | 9/2014 | Le | |

FOREIGN PATENT DOCUMENTS

| | | | |
|---|---|---|---|
| CN | 102122708 | * | 7/2011 |
| JP | 10102101 | | 4/1998 |

* cited by examiner

*Primary Examiner* — Laura Weiner
(74) *Attorney, Agent, or Firm* — BakerHostetler

(57) ABSTRACT

An electrochemically active material includes a silicon alloy material having the formula:

$$Si_w M^1_x C_y O_z,$$

where w, x, y, and z represent atomic % values and w+x+y+z=1; $M^1$ comprises a transition metal; w>0; x>0; y≥0; and z≥0. The electrochemically active material also includes a metal-based material having the formula:

$$M^2_a O_b A_c,$$

where a, b, and c represent atomic % values and a+b+c=1; $M^2$ comprises a metal; A is an anion; a>0; b≥0; and c≥0.

12 Claims, 9 Drawing Sheets

ANODE MATERIALS FOR LITHIUM ION BATTERIES AND METHODS OF MAKING AND USING SAME

CROSS REFERENCE TO RELATED APPLICATIONS

This application claims priority from U.S. Provisional Application Ser. No. 62/435,240, filed Dec. 16, 2016, the disclosure of which is incorporated by reference in its entirety herein.

FIELD

The present disclosure relates to compositions useful in anodes for lithium ion batteries and methods for preparing and using the same.

BACKGROUND

Various anode compositions have been introduced for use in lithium-ion batteries. Such compositions are described, for example, in U.S. Pat. No. 8,071,238 and U.S. Patent Application Publication 2014/0057176.

SUMMARY

In some embodiments, an electrochemically active material is provided. The electrochemically active material includes a silicon alloy material having the formula:

$Si_w M^1_x C_y O_z$, where w, x, y, and z represent atomic % values and w+x+y+z=1; $M^1$ comprises a transition metal; w>0; x>0; y≥0; and z≥0. The electrochemically active material also includes a metal-based material having the formula:

$M^2_a O_b A_c$, where a, b, and c represent atomic % values and a+b+c=1; $M^2$ comprises a metal; A is an anion; a>0; b≥0; and c≥0.

In some embodiments, an electrode composition is provided. The electrode composition includes the above-described electrochemically active material and a binder.

In some embodiments, a negative electrode is provided. The negative electrode includes a current collector and the above-described electrode composition.

In some embodiments, an electrochemical cell is provided. The electrochemical cell includes the above-described negative electrode, a positive electrode comprising a positive electrode composition comprising lithium, and an electrolyte comprising lithium.

In some embodiments, a method of making an electrochemical cell is provided. The method includes providing a positive electrode comprising a positive electrode composition comprising lithium, providing a negative electrode as described above, providing an electrolyte comprising lithium, and incorporating the positive electrode, negative electrode, and the electrolyte into an electrochemical cell.

The above summary of the present disclosure is not intended to describe each embodiment of the present disclosure. The details of one or more embodiments of the disclosure are also set forth in the description below. Other features, objects, and advantages of the disclosure will be apparent from the description and from the claims.

BRIEF DESCRIPTION OF THE DRAWINGS

The disclosure may be more completely understood in consideration of the following detailed description of various embodiments of the disclosure in connection with the accompanying figures, in which.

DETAILED DESCRIPTION

Figure 1:
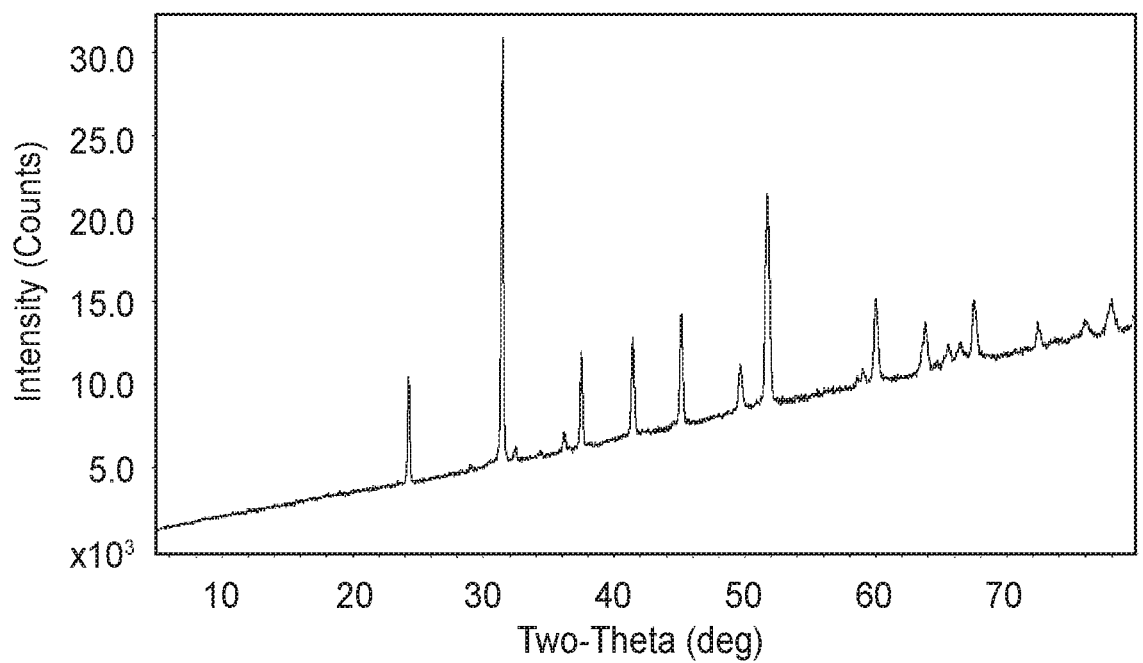
FIG. 1 shows the X-ray diffraction pattern of the bulk $MnCO_3$ nanoparticle powder of one aspect of the present disclosure.

Electrochemical energy storage has become an important technology for a variety of applications, including grid storage, electric vehicles, and portable electronic devices. The lithium-ion battery is an attractive energy storage device because of its relatively high energy density and good rate capability. To further increase the energy density for more demanding applications, however, new electrode materials with higher specific and volumetric capacity are desired.

To meet the increasing demand for energy storage capability, electrode materials with higher capacity, low manufacturing cost, and the ability to be produced at large scale have been sought. Alloy-type anodes (such as Si, Ge, Sn, Al, Sb, Pb, P, B, As, and In) have much higher lithium (Li) storage capacity than the intercalation-type graphite anode that is currently used in Li-ion batteries. Among all the alloy anodes, silicon has the highest specific capacity.

High capacity silicon alloy anode materials, such as Si—Fe—Sn and Si—Fe—C alloys, have been developed. These types of alloy anode materials have demonstrated an initial specific capacity of >1000 mAh/g, which is 3-4 times of the capacity of graphite. However, graphite anodes still dominate the market place due to the fact that alloy anodes have two major challenges that have slowed their widespread adoption. First, alloy anodes undergo significant volume expansion and contraction during Li insertion/extraction. This volume change (~300% for Si and ~100% for some silicon alloys) can result in pulverization of the initial particle morphology and causes the loss of electrical contact between active materials and the electrode framework. Second, due to the low electrochemical potential of Li insertion/extraction (<0.5 V vs Li+/Li), the anode surface becomes covered by a solid-electrolyte interphase (SEI) film, which forms due to the reductive decomposition of the organic electrolyte. In graphite anodes, a thin passivating SEI forms during the first few cycles, and its further formation is terminated due to the electronically insulating nature of the SEI. In alloy anodes, however, the SEI will rupture due to the volume change during cycling, causing the electrode surface to be cyclically exposed to the electrolyte. This results in continual formation of very thick SEI films, which causes the electrolyte to be continually consumed during cycling. The formation of SEI is further complicated by particle fracture, since fracture creates new active surfaces for SEI growth. The excessive growth of SEI causes low Coulombic efficiency, higher resistance to ionic transport, and low electronic conductivity of the whole electrode, and it will eventually result in the exhaustion of the electrolyte and dry-out of the cell.

For these reasons, silicon alloy anode materials having a protective coating on the surface to prevent the SEI film formation and reduce the effect of the volume expansion during the charge and discharge cycling may be desirable. In this regard, the present disclosure, generally, is directed to nano-structured metal compounds, such as metal oxides, on the surface of silicon anode materials. These nano-structured metal oxide coatings can prevent or mitigate corrosion and SEI film formation. In turn, battery performance is significantly improved, particularly in terms of cycling life stability.

As used herein, the terms "lithiate" and "lithiation" refer to a process for adding lithium to an electrode material or electrochemically active phase;

the terms "delithiate" and "delithiation" refer to a process for removing lithium from an electrode material or electrochemically active phase;

the terms "charge" and "charging" refer to a process for providing electrochemical energy to a cell;

the terms "discharge" and "discharging" refer to a process for removing electrochemical energy from a cell, e.g., when using the cell to perform desired work;

the phrase "charge/discharge cycle" refers to a cycle wherein an electrochemical cell is fully charged, i.e. the cell attains it's upper cutoff voltage and the cathode is at about 100% state of charge, and is subsequently discharged to attain a lower cutoff voltage and the cathode is at about 100% depth of discharge;

the phrase "positive electrode" refers to an electrode (often called a cathode) where electrochemical reduction and lithiation occurs during a discharging process in a full cell the phrase "negative electrode" refers to an electrode (often called an anode) where electrochemical oxidation and delithiation occurs during a discharging process in a full cell;

the term "alloy" refers to a substance that includes any or all of metals, metalloids, or semimetals;

the phrase "electrochemically active material" refers to a material, which can include a single phase or a plurality of phases, that can electrochemically react or alloy with lithium under conditions possibly encountered during charging and discharging in a lithium ion battery (e.g., voltages between 0 V and 2 V versus lithium metal);

the phrase "electrochemically inactive material" refers to a material, which can include a single phase or a plurality of phases, that does not electrochemically react or alloy with lithium under conditions possibly encountered during charging and discharging in a lithium ion battery (e.g., voltages between 0 V and 2 V versus lithium metal);

the phrases "electrochemically active phase" or "active phase" refer to a phase of an electrochemically active material that can electrochemically react or alloy with lithium under conditions possibly encountered during charging and discharging in a lithium ion battery (e.g., voltages between 0 V and 2 V versus lithium metal);

the phrases "electrochemically inactive phase" or "inactive phase" refer to phases of an electrochemically active material that does not electrochemically react or alloy with lithium under conditions possibly encountered during charging and discharging in a lithium ion battery (e.g., voltages between 0 V and 2 V versus lithium metal);

the phrases "electrochemically active chemical element" or "active chemical element" refer to chemical elements that can electrochemically react or alloy with lithium under conditions possibly encountered during charging and discharging in a lithium ion battery (e.g., voltages between 0 V and 2 V versus lithium metal);

the phrase "substantially homogeneous" refers to a material in which the components or domains of the material are sufficiently mixed with one another such that the make-up of one portion of the material is the same as that of any other portion of the material on a length scale of 100 nanometers or more; and As used herein, the singular forms "a", "an", and "the" include plural referents unless the content clearly dictates otherwise. As used in this specification and the appended embodiments, the term "or" is generally employed in its sense including "and/or" unless the content clearly dictates otherwise.

As used herein, the recitation of numerical ranges by endpoints includes all numbers subsumed within that range (e.g. 1 to 5 includes 1, 1.5, 2, 2.75, 3, 3.8, 4, and 5).

Unless otherwise indicated, all numbers expressing quantities or ingredients, measurement of properties and so forth used in the specification and embodiments are to be understood as being modified in all instances by the term "about." Accordingly, unless indicated to the contrary, the numerical parameters set forth in the foregoing specification and attached listing of embodiments can vary depending upon the desired properties sought to be obtained by those skilled in the art utilizing the teachings of the present disclosure. At the very least, and not as an attempt to limit the application of the doctrine of equivalents to the scope of the claimed embodiments, each numerical parameter should at least be construed in light of the number of reported significant digits and by applying ordinary rounding techniques.

In some embodiments, the present disclosure relates to an electrochemically active material for use in an electrochemical cell (e.g., a lithium ion battery). For example, the electrochemically active material may be incorporated into a negative electrode for a lithium ion battery.

In some embodiments, the electrochemically active material may include a silicon alloy material having the formula:

$$Si_wM^1_xC_yO_z$$

where w, x, y, and z represent atomic % values and w+x+y+z=1; $M^1$ is one or more transition metal; w>0; x>0; y≥0; and z≥0. In some embodiments $M^1$ may include one or more of Sn, Ti, V, Cr, Mn, Fe, Co, Ni, Cu, Zn, Zr, Mg, Al, W, Mo, B, P, Ge, Pb, Sb or Ti, V, Mn, Fe, Co, Ni, Cu, Zn, Zr, Mg, Al, B, or P. In some embodiments, $M^1$ may include iron. In some embodiments w may be between 10% and 90%, 30% and 80%, 50% and 80%; or 70% and 80%; x may be between 1% and 50%, 1% and 30%, or 1% and 20%; y may be between 0% and 30%, 0.1% and 20%, or 1% and 10%; and z may be between 0% and 20%, 0% and 10%, or 4% and 6%. In some embodiments, the silicon alloy material may be described as one or more active phases and one or more inactive phases. The active phases may be in the form of or include an active chemical element, an active alloy, or combinations thereof. The active phases may include silicon and one or more additional active chemical elements such as, for example, magnesium (Mg), calcium (Ca), strontium (Sr), silver (Ag), zinc (Zn), boron (B), aluminum (Al), tin (Sn), lead (Pb), antimony (Sb), bismuth (Bi), or combinations thereof. In some embodiments, the active phase may consist essentially of silicon. The electrochemically active phase and the electrochemically inactive phase may share at least one common phase boundary. In various embodiments, the electrochemically inactive phase may be in the form of or include one or more electrochemically inactive chemical elements, including transition metals (e.g., titanium, vanadium, chromium, manganese, iron, cobalt, nickel), alkaline earth metals, rare earth metals, or combinations thereof. In various embodiments, the electrochemically inactive phase may be in the form of an alloy. In various embodiments, the electrochemically inactive phase may include a transition metal or combination of transition metals. In some embodiments, the electrochemically inactive phase may include one or more active chemical elements, including tin, carbon, gallium, indium, silicon, germanium, lead, antimony, bismuth, or combinations thereof. In some embodiments, the electrochemically inactive phase may include compounds such as silicides, aluminides, borides, carbides, nitrides, phosphates or stannides. The electrochemically inactive phase may include oxides, such as titanium oxide, zinc oxide, silicon oxide, aluminum oxide or sodium-aluminum oxide.

In some embodiments, each of the phases of the silicon alloy material (i.e., the active phase, inactive phase, or any other phase of the active material) may include or be in the form of one or more grains. In some embodiments, the Scherrer grain size of each of the phases of the silicon alloy material is no greater than 50 nanometers, no greater than 20 nanometers, no greater than 15 nanometers, no greater than 10 nanometers, or no greater than 5 nanometers. As used herein, the Scherrer grain size of a phase of a material is determined, as is readily understood by those skilled in the art, by X-ray diffraction and the Scherrer equation. In some embodiments, the phases of the silicon alloy material may be distributed substantially homogeneously throughout the material, including the surface and bulk of the material.

In some embodiments, the electrochemically active material may further include one or more metal-based material having the formula:

$$M^2_aO_bA_c$$

where a, b, and c represent atomic % values and a+b+c=1; $M^2$ is a metal; A is an anion; a>0; b≥0; and c≥0. In some embodiments $M^2$ may include one or more of Li, Na, K, Rb, Cs, Mg, Ca, Sr, Ba, Sc, Y, Ti, Zr, V, Nb, Ta, Cr, Mo, W, Mn, Tc, Re, Fe, Ru, Os, Co, Rh, Ir, Ni, Pd, Pt, Cu, Ag, Au, Zn, Cd, Al, Ga, In, Si, Ge, Sn, Pb, La, Ce, Nd or Li, Mg, Ca, Ba, Y, Ti, Zr, V, Cr, Mo, W, Mn, Co, Ni, Cu, Ag, Zn, Al, In, Ce. In some embodiments a may be between 0.01 and 0.90, 0.2 and 0.75, or 0.3 to 0.5; b may be between 0.1 and 0.90, 0.25 and 0.80, or 0.5 to 0.75; and c may be between 0.1 and 0.90, 0.25 and 0.80, or 0.5 to 0.75. In some embodiments, the anion A may include one or more of a hydroxide (OH) anion, nitrate ($NO_3$) anion, carbonate ($CO_3$) anion, sulfate ($SO_4$) anion, phosphate ($PO_4$) anion, acetate ($CH_3COO$) anion, or or $P_2O_7$ anion. In some embodiments, the metal-based material be the reaction product of a metal salt or mixtures of different metal salts composed of above metals and anions (e.g., $TiOSO_4$, $Cu(NO_3)_2$, $CuSO_4$, $CuCl_2$, $Cu_2(PO_4)_3$, $CuH(PO_4)$, $Cu(CH_3CO_2)_2$, $Ni(NO_3)_2$, $NiCl_2$, $NiSO_4$, $Co(NO_3)_2$, $CoSO_4$, $CoCl_2$, $Ca(NO_3)_2$, $Mg(NO_3)_2$, $InCl_3$, $In(NO_3)_3$, $SnCl_4$, $Zn(NO_3)_2$, $Mn(NO_3)_2$, $ZrO(NO_3)_2$, $Al(NO_3)_3$) and urea ($CO(NH_2)_2$) or its similar compounds (e.g., urea phosphate).

In some embodiments, the electrochemically active material may include the silicon alloy material in an amount of between 50 and 99.9 wt. %, 80 and 99.5 wt. %, or 90 and 99 wt. %, based on the total weight of the electrochemically active material. In some embodiments, the electrochemically active material may include the metal based material in an amount of between 0.1 and 50 wt. %, 0.1 and 30 wt. %, 0.1 and 20 wt. %, 0.5 and 15 wt. %, or 0.5 and 10 wt. %, based on the total weight of the electrochemically active material.

In some embodiments, the above-described silicon alloy material (e.g., in the form of particles) may bear on an exterior surface thereof a coating that at least partially surrounds (and up to completely surrounds) the silicon alloy material. By "at least partially surrounds" it is meant that there is a common boundary between the coating and the exterior of the active material. In some embodiments, such coating may include the above-described metal-based material. The metal-based material may be present on the surface of the silicon alloy material at an average thickness of between 1 and 5000 nm, 1 and 1000 nm, or 1 and 100 nm.

In some embodiments, the silicon alloy material may also include one or more coatings that can function as a chemically protective layer and can stabilize, physically and/or chemically, the components of the active material. Exemplary materials useful for such additional coatings include amorphous carbon, graphitic carbon, LiPON glass, phosphates such as lithium phosphate ($Li_2PO_3$), lithium metaphosphate ($LiPO_3$), lithium dithionate ($LiS_2O_4$), lithium fluoride (LiF), lithium metasilicate ($LiSiO_3$), and lithium orthosilicate ($Li_2SiO_4$). Generally, the coatings can be applied by milling, solution deposition (e.g., precipitation), vapor phase processes, or other processes known to those of ordinary skill in the art.

In some embodiments, the electrochemically active material may take the form of particles (e.g., coated particles). The particles may have a diameter (or length of longest dimension) that is no greater than 60 μm, no greater than 40 μm, no greater than 20 μm, no greater than 10 μm, no greater than 7 μm, or even smaller; at least 0.5 μm, at least 1 μm, at least 2 μm, at least 5 μm, or at least 10 μm or even larger; or 0.5 to 10 μm, 1 to 10 μm, 2 to 10 μm, 40 to 60 μm, 1 to 40 µm, 2 to 40 µm, 10 to 40 µm, 5 to 20 µm, 10 to 20 µm, 1 to 30 µm, 1 to 20 µm, 1 to 10 µm, 0.5 to 30 µm, 0.5 to 20 µm, or 0.5 to 10 µm.

In some embodiments the electrochemically active material may take the form of particles having low surface area. The particles may have a surface area that is less than 20 $m^2/g$, less than 12 $m^2/g$, less than 10 $m^2/g$, less than 5 $m^2/g$, less than 4 $m^2/g$, or even less than 2 $m^2/g$.

In some embodiments, the present disclosure is further directed to negative electrode compositions for use in lithium ion batteries. The negative electrode compositions may include the above-described electrochemically active materials. Additionally, the negative electrode compositions may include one or more additives such as binders, conductive diluents, fillers, adhesion promoters, thickening agents for coating viscosity modification such as carboxymethylcellulose, polyacrylic acid, polyvinylidene fluoride, lithium polyacrylate, carbon black, or other additives known by those skilled in the art. In some embodiments, the above described electrochemically active materials may be present in the negative electrode compositions in an amount of between 5 wt. % and 70 wt. %, between 10 wt. % and 60 wt. %, between 10 wt. % and 50 wt. %, between 15 wt. % and 40 wt. %, or between 15 wt. % and 30 wt. %, based on the total weight of the negative electrode composition.

In illustrative embodiments, the negative electrode compositions may include an electrically conductive diluent to facilitate electron transfer from the composition to a current collector. Electrically conductive diluents include, for example, carbons, powdered metal, metal nitrides, metal carbides, metal silicides, and metal borides, or combinations thereof. Representative electrically conductive carbon diluents include carbon blacks such as Super P and Super S carbon blacks (both from Timcal, Switzerland), Shawinigan Black (Chevron Chemical Co., Houston, Tex.), acetylene black, furnace black, lamp black, graphite, carbon fibers, carbon nanotubes, and combinations thereof. In some embodiments, the amount of conductive diluent in the electrode composition may be at least 2 wt. %, at least 6 wt. %, or at least 8 wt. %, or at least 20 wt. % based upon the total weight of the electrode coating; less than 5 wt. less than 2 wt. %, or less than 1 wt. % based upon the total weight of the electrode composition, or between 0.2 wt. % and 80 wt. %, between 0.5 wt. % and 50 wt. %, between 0.5 wt. % and 20 wt. %, or between 1 wt. % and 10 wt. %, based upon the total weight of the electrode composition.

In some embodiments, the negative electrode compositions may include graphite to improve the density and cycling performance, especially in calendered coatings, as described in U.S. Patent Application Publication 2008/0206641 by Christensen et al., which is herein incorporated by reference in its entirety. The graphite may be present in the negative electrode composition in an amount of greater than 10 wt. %, greater than 20 wt. %, greater than 50 wt. %, greater than 70 wt. % or even greater, based upon the total weight of the negative electrode composition; or between 20 wt. % and 90 wt. %, between 30 wt. % and 80 wt. %, between 40 wt. % and 60 wt. %, between 45 wt. % and 55 wt. %, between 80 wt. % and 90 wt. %, or between 85 wt. % and 90 wt. %, based upon the total weight of the electrode composition.

In some embodiments, the negative electrode compositions may also include a binder. Suitable binders include oxo-acids and their salts, such as sodium carboxymethylcellulose, polyacrylic acid, lithium polyacrylate, sodium polyacrylate, methyl acrylate/acrylic acid copolymers, lithium methyl acrylate/acrylate copolymers, and other optionally lithium or sodium neutralized polyacrylic acid copolymers. Other suitable binders include polyolefins such as those prepared from ethylene, propylene, or butylene monomers; fluorinated polyolefins such as those prepared from vinylidene fluoride monomers; perfluorinated polyolefins such as those prepared from hexafluoropropylene monomer; perfluorinated poly(alkyl vinyl ethers); perfluorinated poly(alkoxy vinyl ethers); or combinations thereof. Other suitable binders include polyimides such as the aromatic, aliphatic or cycloaliphatic polyimides and polyacrylates. The binder may be crosslinked. In some embodiments, the amount of binder in the electrode composition may be at least 3 wt. %, at least 5 wt. %, at least 10 wt. %, or at least 20 wt. % based upon the total weight of the electrode coating; less than 30 wt. %, less than 20 wt. %, or less than 10 wt. %, based upon the total weight of the electrode composition; or between 3 wt. % and 30 wt. %, between 3 wt. % and 20 wt. %, or between 3 wt. % and 10 wt. %, based upon the total weight of the electrode composition.

In some embodiments, the present disclosure is further directed to negative electrodes for use in lithium ion electrochemical cells. The negative electrodes may include a current collector having disposed thereon the above-described negative electrode composition. The current collector may be formed of a conductive material such as a metal (e.g., copper, aluminum, nickel), or a carbon composite.

In some embodiments, the present disclosure further relates to lithium ion electrochemical cells. In addition to the above-described negative electrodes, the electrochemical cells may include a positive electrode, an electrolyte, and a separator. In the cell, the electrolyte may be in contact with both the positive electrode and the negative electrode, and the positive electrode and the negative electrode are not in physical contact with each other; typically, they are separated by a polymeric separator film sandwiched between the electrodes.

In some embodiments, the positive electrode may include a current collector having disposed thereon a positive electrode composition that includes a lithium transition metal oxide intercalation compound such as $LiCoO_2$, $LiCO_{0.2}Ni_{0.8}O_2$, $LiMn_2O_4$, $LiFePO_4$, $LiNiO_2$, or lithium mixed metal oxides of manganese, nickel, and cobalt in any proportion. Blends of these materials can also be used in positive electrode compositions. Other exemplary cathode materials are disclosed in U.S. Pat. No. 6,680,145 (Obrovac et al.) and include transition metal grains in combination with lithium-containing grains. Suitable transition metal grains include, for example, iron, cobalt, chromium, nickel, vanadium, manganese, copper, zinc, zirconium, molybdenum, niobium, or combinations thereof with a grain size no greater than about 50 nanometers.

In various embodiments, useful electrolyte compositions may be in the form of a liquid, solid, or gel. The electrolyte compositions may include a salt and a solvent (or charge-carrying medium). Examples of solid electrolyte solvents include polymers such as polyethylene oxide, polytetrafluoroethylene, fluorine-containing copolymers, and combinations thereof. Examples of liquid electrolyte solvents include ethylene carbonate (EC), diethyl carbonate (DEC), dimethyl carbonate (DMC), ethyl methyl carbonate (EMC), propylene carbonate, fluoroethylene carbonate (FEC), tetrahydrofuran (THF), acetonitrile, and combinations thereof. In some embodiments the electrolyte solvent may comprise glymes, including monoglyme, diglyme and higher glymes, such as tetraglyme Examples of suitable lithium electrolyte salts include LiPF$_6$, LiBF$_4$, LiClO$_4$, lithium bis(oxalato)borate, LiN(CF$_3$SO$_2$)$_2$, LiN(C$_2$F$_5$SO$_2$)$_2$, LiAsF$_6$, LiC(CF$_3$SO$_2$)$_3$, and combinations thereof.

In some embodiments, the lithium ion electrochemical cells may further include a microporous separator, such as a microporous material available from Celgard LLC, Charlotte, N.C. The separator may be incorporated into the cell and used to prevent the contact of the negative electrode directly with the positive electrode.

The disclosed lithium ion electrochemical cells can be used in a variety of devices including, without limitation, portable computers, tablet displays, personal digital assistants, mobile telephones, motorized devices (e.g., personal or household appliances and vehicles), instruments, illumination devices (e.g., flashlights) and heating devices. One or more lithium ion electrochemical cells of this disclosure can be combined to provide a battery pack.

The present disclosure further relates to methods of making the above-described electrochemically active materials. In some embodiments, the materials can be made by methods known to produce films, ribbons or particles of metals or alloys including cold rolling, arc melting, resistance heating, ball milling, sputtering, chemical vapor deposition, thermal evaporation, atomization, induction heating or melt spinning. The above described active materials may also be made via the reduction of metal oxides or sulfides. In some embodiments, the silicon-alloy materials of the present disclosure may be made in accordance with the methods discussed in U.S. Pat. No. 8,257,864, which is hereby incorporated by reference in its entirety.

In some embodiments, the metal-based material may be made and deposited on the silicon-alloy materials using a precipitation-type method. For example, the silicon-alloy material may be combined in solution (e.g., an aqueous solution) with precursor materials for the metal-based material (e.g., a metal salt and urea). The solution may then be agitated and subjected to heating (e.g., 80-120 degrees Celsius) for a suitable period. The solids (i.e., the coated silicon-alloy material) may then be separated from the solution by conventional filtration or separation techniques. The solids may then be dried using any conventional drying technique at room temperature or higher temperature up to 700° C., depending on the final composition of the coating materials. Alternatively, the metal-based material may be deposited onto the silicon-alloy material by chemical deposition, chemical vapor deposition, atomic vapor deposition, thermal evaporation, sputtering, chemical reaction, hydrolysis, chemical or physical adsorption, electrochemical deposition, or any other conventional technique.

The present disclosure further relates to methods of making negative electrodes that include the above-described negative electrode compositions. In some embodiments, the method may include mixing the above-described electrochemically active materials, along with any additives such as binders, conductive diluents, fillers, adhesion promoters, thickening agents for coating viscosity modification and other additives known by those skilled in the art, in a suitable coating solvent such as water or N-methylpyrrolidinone to form a coating dispersion or coating mixture. The dispersion may be mixed thoroughly and then applied to a foil current collector by any appropriate coating technique such as knife coating, notched bar coating, dip coating, spray coating, electrospray coating, or gravure coating. The current collectors may be thin foils of conductive metals such as, for example, copper, aluminum, stainless steel, or nickel foil. The slurry may be coated onto the current collector foil and then allowed to dry in air or vacuum, and optionally by drying in a heated oven, typically at about 80° to about 500° C. for about an hour to remove the solvent.

The present disclosure further relates to methods of making lithium ion electrochemical cells. In various embodiments, the method may include providing a negative electrode as described above, providing a positive electrode that includes lithium, and incorporating the negative electrode and the positive electrode into an electrochemical cell comprising a lithium-containing electrolyte.

In accordance with the compositions and methods of the present disclosure, electrochemically active materials having improved cycle performance may be obtained. The electrochemically active materials further exhibit electrical conductivity and electrochemical capacity. As demonstrated by the illustrative examples described below, electrochemical cells constructed using the electrochemically active materials of the present disclosure exhibit increases in percent capacity retention of greater than 50% after 50 cycles, and greater than 25% after 100 cycles.

Listing of Embodiments

1. An electrochemically active material comprising:
   a silicon alloy material having the formula:

$$Si_wM^1_xC_yO_z,$$

where w, x, y, and z represent atomic % values and w+x+y+z=1; M$^1$ comprises a transition metal; w>0; x>0; y≥0; and z≥0; and
   a metal-based material having the formula:

$$M^2_aO_bA_c,$$

where a, b, and c represent atomic % values and a+b+c=1; M$^2$ comprises a metal; A is an anion; a>0; b≥0; and c≥0.
2. The electrochemically active material according to embodiment 1, wherein M$^1$ comprises Sn, Ti, V, Cr, Mn, Fe, Co, Ni, Cu, Zn, Zr, Mg, Al, W, Mo, B, or P.
3. The electrochemically active material according to any one of the previous embodiments, wherein M$^2$ comprises Li, Na, K, Rb, Cs, Mg, Ca, Sr, Ba, Sc, Y, Ti Zr, V, Nb, Ta, Cr, Mo, W, Mn, Tc, Re, Fe, Ru, Os, Co, Rh, Ir, Ni, Pd, Pt, Cu, Ag, Au, Zn, Cd, Al, Ga, In, Si, Ge, Sn, Pb, La, Ce, or Nd.
4. The electrochemically active material according to any one of the previous embodiments, wherein A comprises a hydroxide, nitrate, carbonate, sulfate, phosphate, acetate, fluoride, chloride, bromide, iodide, PO$_3$, or P$_2$O$_7$.
5. The electrochemically active material according to any one of the previous embodiments, wherein the metal-based material comprises the reaction product of a metal salt and urea or urea phosphate.
6. The electrochemically active material according to any one of the previous embodiments, wherein the electrochemically active material comprises the silicon alloy material in an amount of between 50 and 99 wt. %, based on the total weight of the electrochemically active material.
7. The electrochemically active material according to any one of the previous embodiments, wherein the electrochemically active material comprises the metal-based material in an amount of between 0.1 and 20 wt. %, based on the total weight of the electrochemically active material.
8. The electrochemically active material according to any one of the previous embodiments, wherein the Scherrer grain size of each of the phases of the silicon alloy material is no greater than 50 nanometers.

9. The electrochemically active material according to any one of the previous embodiments, wherein the silicon alloy material comprises particles, wherein the electrochemically active material further comprises a coating disposed on an exterior surface of the particles, and wherein the coating comprises the metal-based material.
10. An electrode composition comprising:
   the electrochemically active material according to any one of embodiments 1-9; and
   a binder.
11. An electrode composition according to embodiment 10, further comprising graphite.
12. A negative electrode comprising:
   the electrode composition according to any one of embodiments 11-12; and
   a current collector.
13. An electrochemical cell comprising:
   the negative electrode of embodiment 12;
   a positive electrode comprising a positive electrode composition comprising lithium; and
   an electrolyte comprising lithium.
14. An electronic device comprising the electrochemical cell according to embodiment 13.
15. A method of making an electrochemical cell, the method comprising:
   providing a positive electrode comprising a positive electrode composition comprising lithium;
   providing a negative electrode according to embodiment 12;
   providing an electrolyte comprising lithium; and
   incorporating the positive electrode, negative electrode, and the electrolyte into an electrochemical cell.

The operation of the present disclosure will be further described with regard to the following detailed examples. These examples are offered to further illustrate various specific embodiments and techniques. It should be understood, however, that many variations and modifications may be made while remaining within the scope of the present disclosure.

EXAMPLES

Materials Used:
The materials used and their sources are listed in Table 1. Unless otherwise indicated, all materials were purchased from commercial sources and used as received.

TABLE 1

Materials List
Materials

| Designation | Description and Sources |
| --- | --- |
| Silicon alloy A | Silicon alloy material refers to the general class of materials disclosed in U.S. Pat. No. 8,071,238 B2. More specifically, the composition that was used for experiments has the formula $Si_{72.68}Fe_{17.08}C_{10.23}$. Available from 3M Co., St. Paul, MN. |
| Silicon alloy B | Silicon alloy material refers to the general class of materials disclosed in U.S. Pat. No. 8,071,238 B2. More specifically, the composition that was used for experiments has the formula $Si_{75.42}Fe_{13.89}C_{10.70}$. Available from 3M Co., St. Paul, MN. |
| Silicon alloy C | Silicon alloy material, refers to the general class of materials disclosed in U.S. Pat. No. 8,753,545 B2. More specifically, the composition that was used for experiments has the formula $Si_{68.49}Fe_{12.60}O_{18.90}$. Available from 3M Co., St. Paul, MN. |
| Silicon alloy D | Silicon alloy material refers to the general class of materials disclosed in U.S. Pat. Appl. No. 2014261899. More specifically, the composition that was used for experiments has the formula $Si_{73.27}Sn_{1.73}Fe_{21.49}C_{3.51}$. Available from 3M Co., St. Paul, MN. |
| Silicon alloy E | Nano carbon coated silicon alloy $Si_{75.42}Fe_{13.89}C_{10.70}$. Available from 3M Co., St. Paul, MN. |
| Super P carbon black | Conductive carbon black available under the trade name "SUPERP" from Timcal Ltd., Bodio, Switzerland. |
| Urea | $CH_4N_2O$, available from Sigma-Aldrich, St. Louis, MO. |
| $Cu(NO_3)_2 \cdot 3H_2O$ | Copper nitrate trihydrate available from Morton Thiokol, Inc., Danvers, MO. |
| $TiOSO_4 \cdot H_2SO_4 \cdot H_2O$ | Titanium oxysulfate-sulfuric acid and complex hydrate available from Sigma-Aldrich, St. Louis, MO. |
| $TiOSO_4 \cdot 2H_2O$ | Titanium (IV) oxysulfate dehydrate available from NOAH Technologies Corporation, San Antonio, TX. |
| $Al(NO_3)_3 \cdot 9H_2O$ | Aluminum nitrate nonahydrate available from Sigma-Aldrich, St. Louis, MO. |
| $Mn(NO_3)_2 \cdot xH_2O$ | Manganese(II) nitrate hydrate available from Sigma-Aldrich, St. Louis, MO. |
| $Zn(NO_3)_2 \cdot 6H_2O$ | Zinc nitrate hexahydrate available from Sigma-Aldrich, St. Louis, MO. |
| $Mg(NO_3)_2 \cdot 6H_2O$ | Magnesium nitrate hexahydrate available from Sigma-Aldrich, St. Louis, MO. |
| $Co(NO_3)_2 \cdot 6H_2O$ | Cobalt(II) nitrate hexahydrate available form Sigma-Aldrich, St. Louis, MO. |
| $Ni(NO_3)_2 \cdot 6H_2O$ | Nickel(II) nitrate hexahydrate available form Sigma-Aldrich, St. Louis, MO. |
| KS6 | A Graphite available from Timcal Ltd., Bodio, Switzerland. |
| MAG-E | A graphite available from Hitachi Chemical Co. America Ltd., Cupertino, CA. |
| SMG-N-HE1 | A graphite available from Hitachi Chemical Co. Ltd., Tokyo, Japan. |
| LiPAA | A binder solution was prepared as follows: 35 wt % aqueous solution of polyacrylic acid (PAA) (250K MW, available from Sigma-Aldrich), deionized water, and lithium hydroxide monohydrate (available from Sigma- |

TABLE 1-continued

Materials List
Materials

| Designation | Description and Sources |
|---|---|
| | Aldrich) were mixed in a 1.00:2.48:0.20 weight ratio, and placed in a shaker for 5 h. The resulting solution is a 10 wt % lithium polyacrylate (LiPAA) aqueous binder solution. |
| Copper foil | A 15 μm copper foil available from Itochu Metals Co., Tokyo, Japan. |
| Lithium foil | Lithium foil counter/reference electrode available from Rockwood Lithium, Frankfurt am Main, Germany. |
| Electrolyte | The electrolyte contains 10 wt % fluoroethylene carbonate (FEC) and 90 wt % Selectilyte LP 57 (1M lithium hexofluorophosphate (LiPF$_6$) in ethylene carbonate:ethyl methyl carbonate (EC:EMC) 30:70 w/w solution, available from BASF, Independence, OH). |

X-Ray Diffraction Test Methods

The following test methods were employed in the evaluation of the examples that follow.

X-Ray Diffraction (XRD)

Metal based materials containing Mn, Zn, Mg, Co, Ni, and Cu were analyzed using X-ray diffraction (XRD) according to the following procedure. Reflection geometry data were collected in the form of a survey scan by use of a PANalytical vertical diffractometer, copper K$_\alpha$ radiation, and Pixcel detector registry of the scattered radiation. The diffractometer was fitted with variable incident beam slits and fixed diffracted beam slits. The survey scan was conducted from 5 to 80 degrees (2θ) using a 0.04 degree step size and 1200 second dwell time. X-ray generator settings of 40 kV and 40 mA were employed.

Metal based materials containing Ti were analyzed using XRD according to the following procedure. Reflection geometry data were collected in the form of a survey scan by use of a Bruker D8 Advance diffractometer, copper K$_\alpha$ radiation, and Vantec detector registry of the scattered radiation. The diffractometer was fitted with variable incident beam slits and fixed diffracted beam slits. The survey scan was conducted in a coupled continuous mode from 5 to 80 degrees (2θ) using a 0.044 degree step size and 8 second dwell time. X-ray generator settings of 40 kV and 40 mA were employed.

Preparation Procedures

The following procedures were used to prepare metal based materials for XRD analysis.

Preparative Examples 1-13

(PE-1-13): Metal Based Materials for XRD Analysis

Metal based materials of the present disclosure were prepared in a water solution. Using the weights of each precursor provided in Table 2, 60.0 g urea and 600 mL deionized water were mixed in a 1000 mL flask. While stirring, the respective metal hydrate was added to the solution. The solution temperature was increased to 90° C. and was held for 3 h under continuous stirring. The solution was then cooled to room temperature. The bulk or coated powders were filtered using a glass microfiber filter and washed with 1000 mL deionized water. The powder was collected and dried in an oven overnight at 120° C. The dried powders were collected for XRD analysis. In order to get bulk metal oxides, 5 grams of dried powder was further calcined at 300 or 500° C. for 4 h under an argon gas atmosphere (see Table 2). These calcined powders were collected for XRD analysis.

PE-1 was used for the preparation of MnCO3 nanoparticles. PE-2 was used for the preparation of Zn$_5$(OH)$_6$(CO$_3$)$_2$ nanoparticles. PE-3 was used for the preparation of magnesium ion containing nanoparticles. PE-4 was used for the preparation of cobalt ion containing nanoparticles. PE-5 was used for the preparation of nickel ion containing nanoparticles. PE-6 was used for the preparation of TiO$_2$ nanoparticles. PE-7 was used for the preparation of Cu$_2$(OH)$_3$(NO$_3$) nanoparticles and was 39.0 wt % loading Cu$_2$(OH)$_3$(NO$_3$) nanoparticle on silicon alloy B. PE-8, PE-9, PE-10, PE-11, PE-12, and PE-13 were used for the preparation of metal oxides CuO, NiO, CoO, MgO, ZnO and MnO, respectively.

TABLE 2*

Bulk Metal Based Materials Prepared for XRD Analysis

Figure 2:
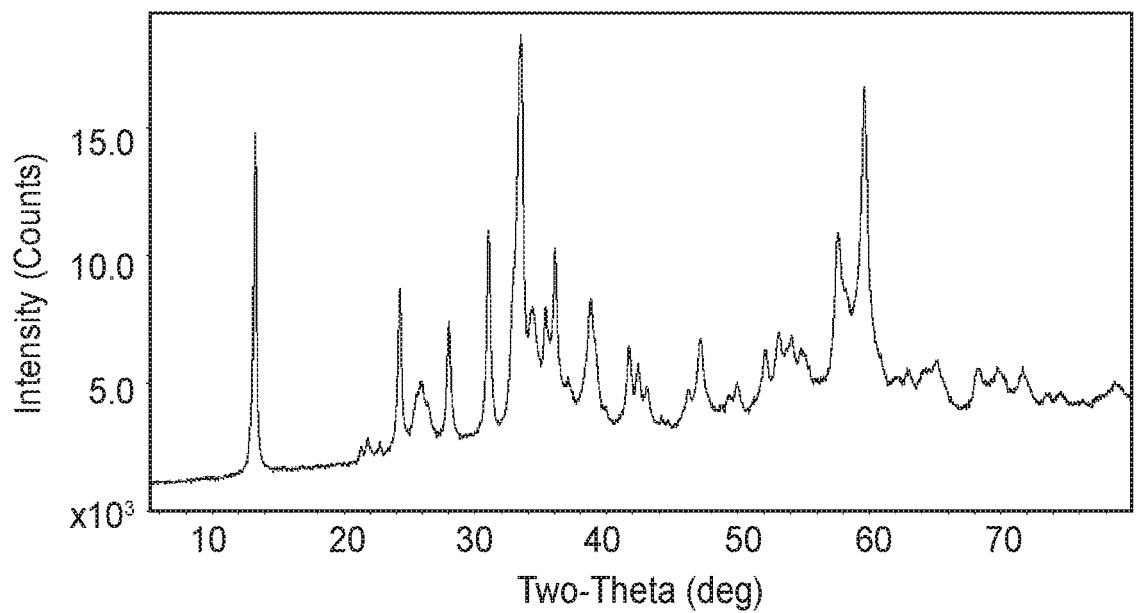
FIG. 2 shows the X-ray diffraction pattern of the bulk $(Zn_5(OH)_6(CO_3)_2$ nanoparticle powder of one aspect of the present disclosure.
Figure 3:
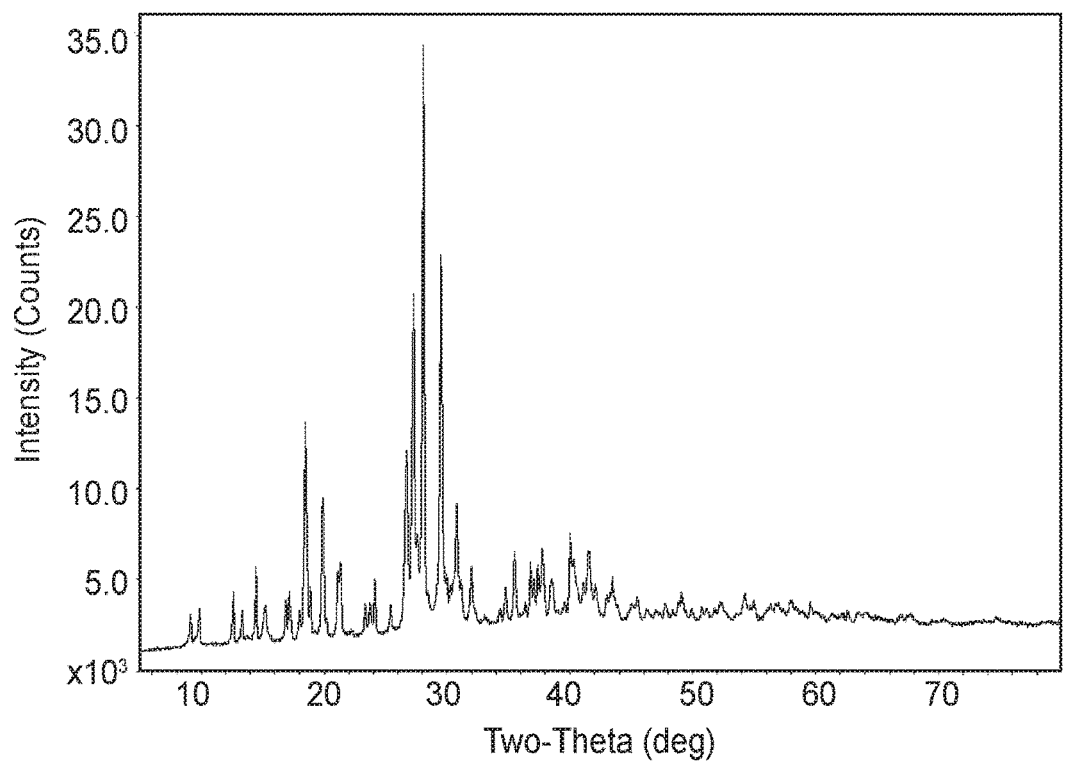
FIG. 3 shows the X-ray diffraction pattern of the magnesium containing nanoparticle powder of one aspect of the present disclosure.
Figure 4:
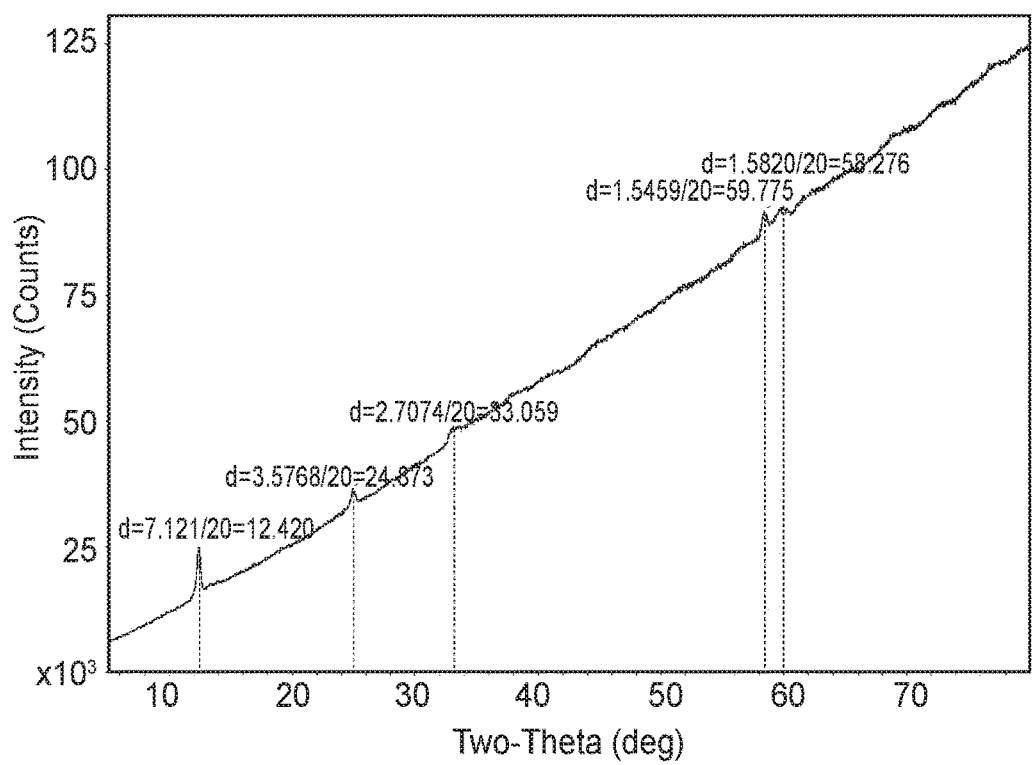
FIG. 4 shows the X-ray diffraction pattern of the cobalt containing nanoparticle powder of one aspect of the present disclosure.
Figure 5:
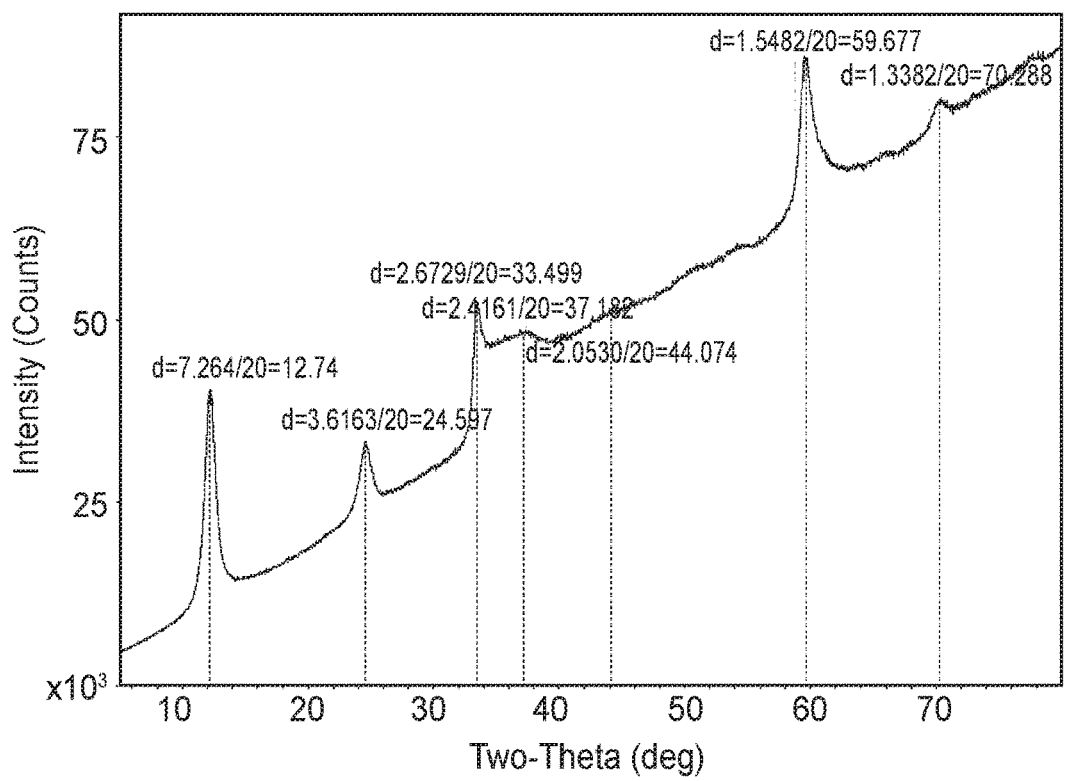
FIG. 5 shows the X-ray diffraction pattern of the nickel ion containing nanoparticle powder of one aspect of the present disclosure.
Figure 6:
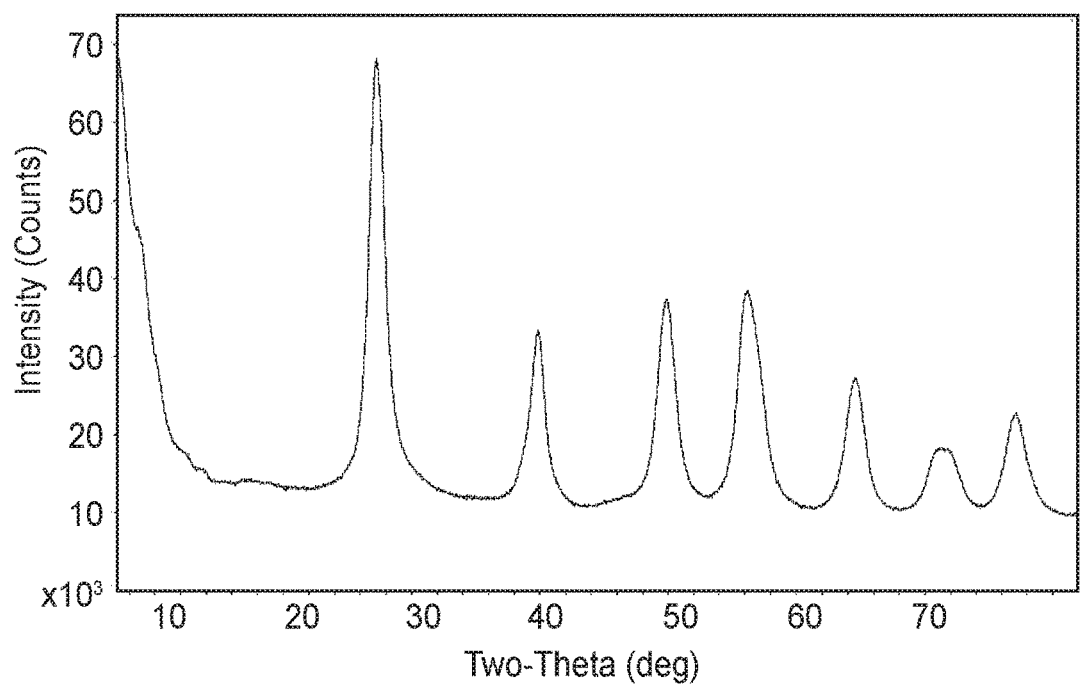
FIG. 6 shows the X-ray diffraction pattern of the bulk $TiO_2$ nanoparticle powder of one aspect of the present disclosure.
Figure 7:
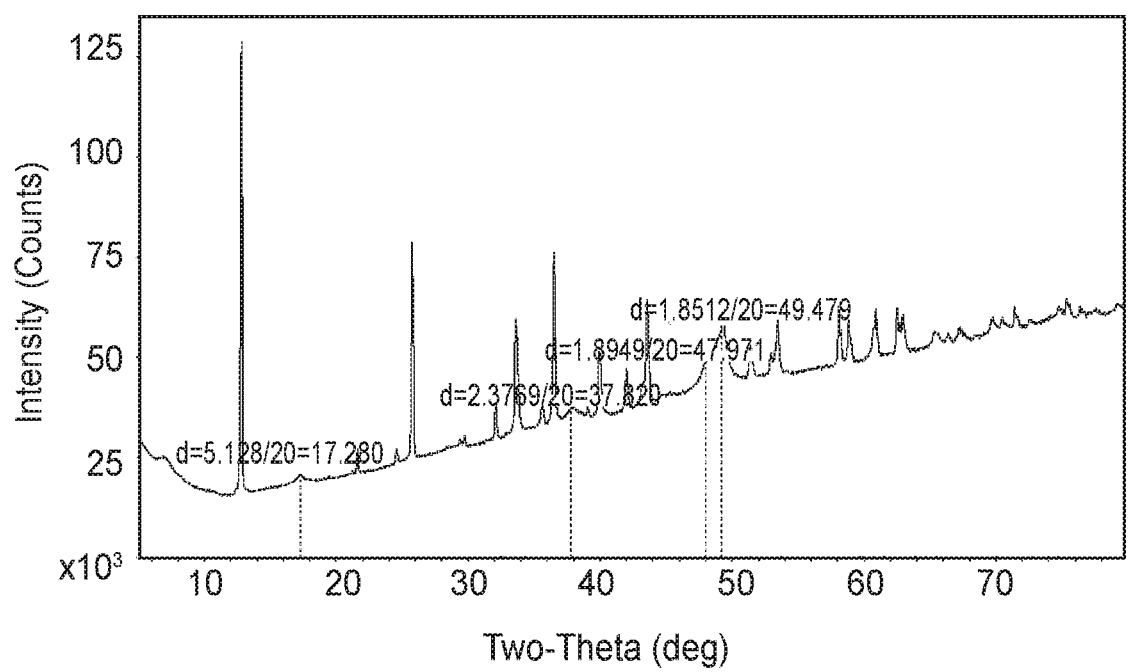
FIG. 7 shows the X-ray diffraction pattern of $Cu_2(OH)_3(NO_3)$ nanoparticles on silicon alloy B of one embodiment of the present disclosure.
Figure 8:
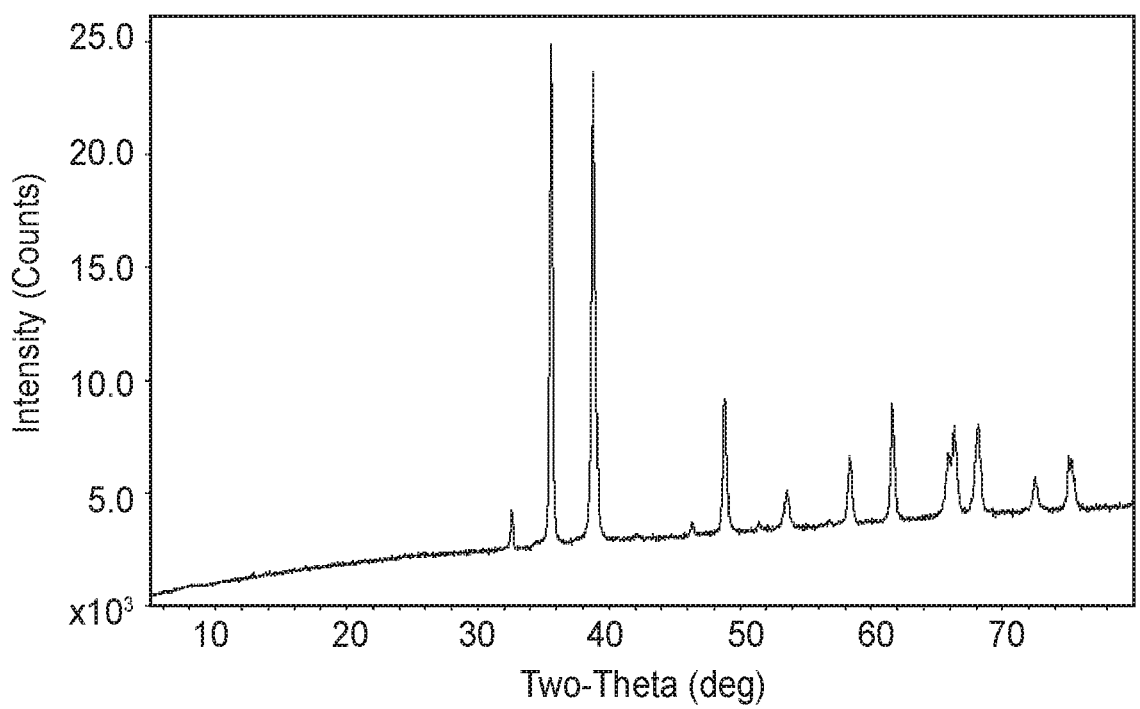
FIG. 8 shows the X-ray diffraction pattern of the bulk CuO nanoparticle powder of one aspect of the present disclosure.
Figure 9:
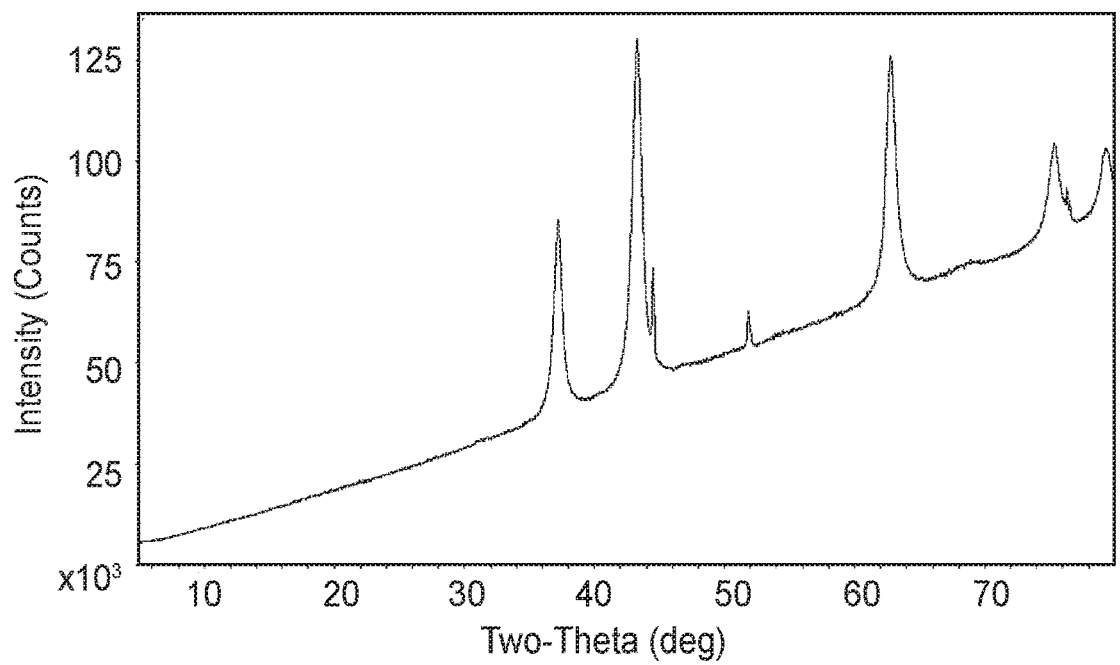
FIG. 9 shows the X-ray diffraction pattern of the bulk NiO nanoparticle powder of one aspect of the present disclosure.
Figure 10:
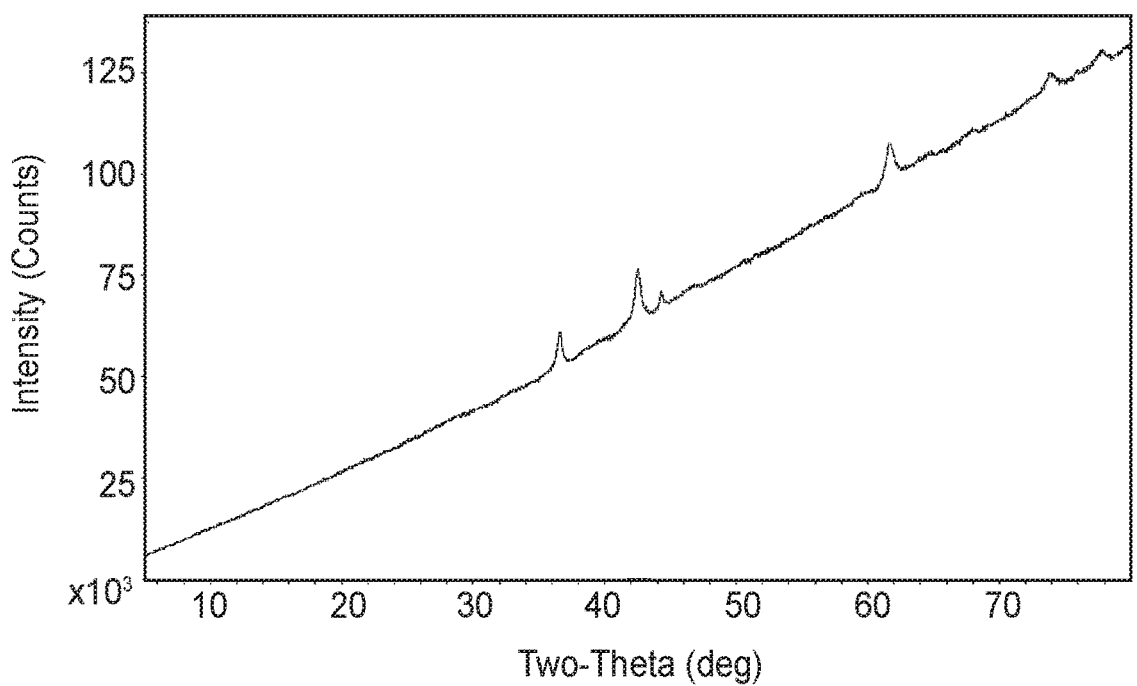
FIG. 10 shows the X-ray diffraction pattern of the bulk CoO nanoparticle powder of one aspect of the present disclosure.
Figure 11:
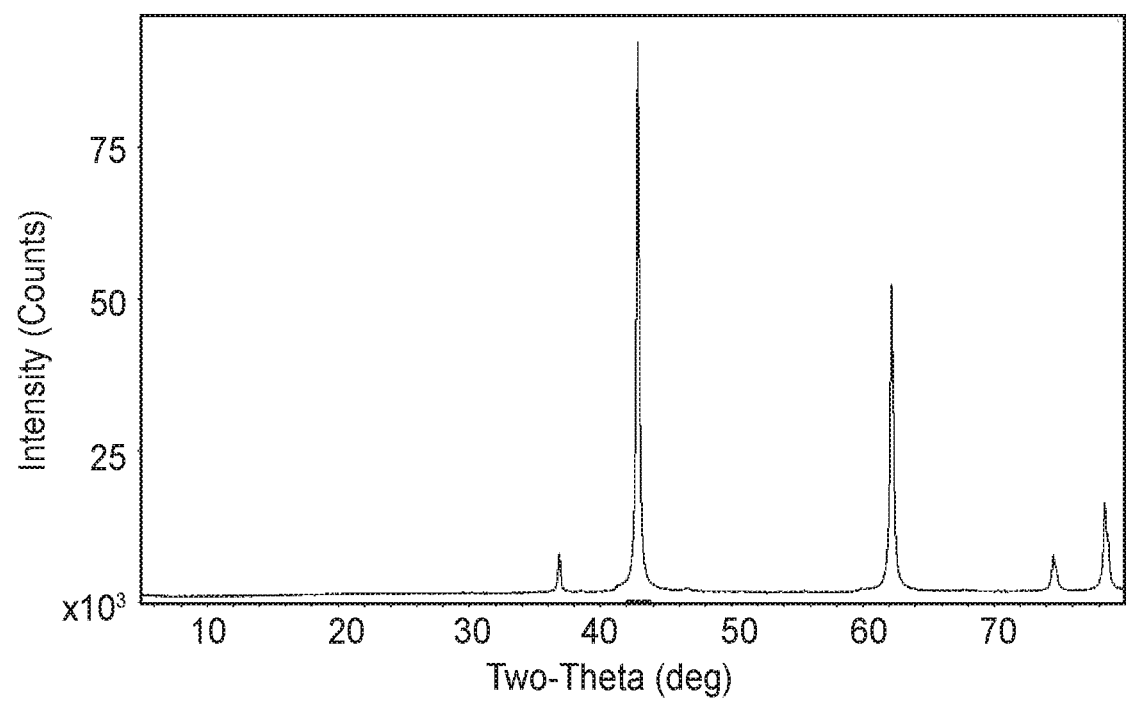
FIG. 11 shows the X-ray diffraction pattern of the bulk MgO nanoparticle powder of one aspect of the present disclosure.
Figure 12:
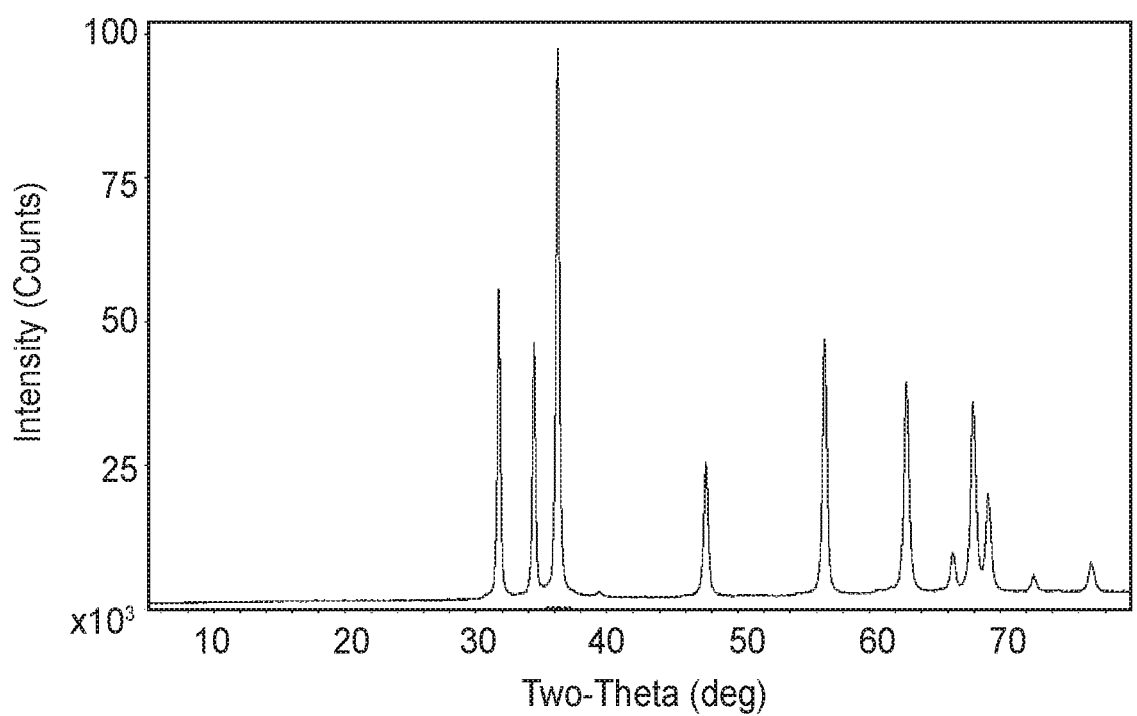
FIG. 12 shows the X-ray diffraction pattern of the bulk ZnO nanoparticle powder of one aspect of the present disclosure.
Figure 13:
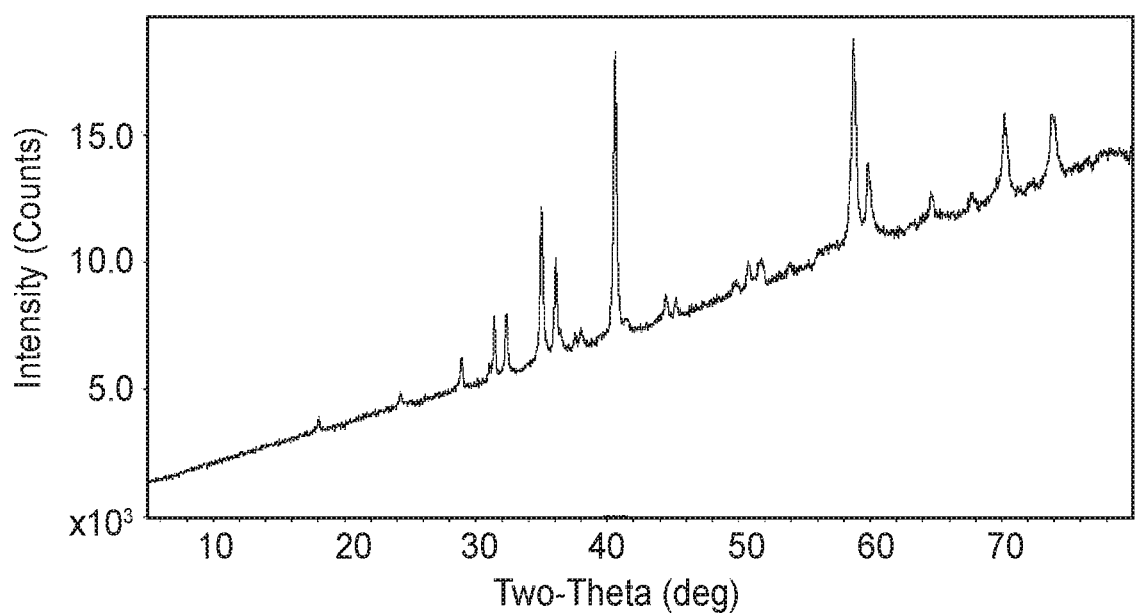
FIG. 13 shows the X-ray diffraction pattern of the bulk MnO nanoparticle powder of one aspect of the present disclosure.

| Example | Metal Material Precursor | Amount of Metal Material Precursor (g) | Calcination Temp (° C.) | Corresponding XRD FIG. |
|---|---|---|---|---|
| PE-1 | Mn(NO$_3$)$_2$•xH$_2$O | 41.275 | — | FIG. 1 |
| PE-2 | Zn(NO$_3$)$_2$•6H$_2$O | 36.551 | — | FIG. 2 |
| PE-3 | Mg(NO$_3$)$_2$•6H$_2$O | 65.556 | — | FIG. 3 |
| PE-4 | Co(NO$_3$)$_2$•6H$_2$O | 39.63 | — | FIG. 4 |
| PE-5 | Ni(NO$_3$)$_2$•6H$_2$O | 38.93 | — | FIG. 5 |
| PE-6 | TiOSO$_4$•2H$_2$O | 49.56 | — | FIG. 6 |
| PE-7[‡] | Cu(NO$_3$)$_2$•3H$_2$O | 26.03 | — | FIG. 7 |
| PE-8 | Cu(NO$_3$)$_2$•3H$_2$O | 60.735 | 300 | FIG. 8 |
| PE-9 | Ni(NO$_3$)$_2$•6H$_2$O | 38.93 | 500 | FIG. 9 |
| PE-10 | Co(NO$_3$)$_2$•6H$_2$O | 39.63 | 500 | FIG. 10 |
| PE-11 | Mg(NO$_3$)$_2$•6H$_2$O | 65.556 | 500 | FIG. 11 |
| PE-12 | Zn(NO$_3$)$_2$•6H$_2$O | 36.551 | 500 | FIG. 12 |
| PE-13 | Mn(NO$_3$)$_2$•xH$_2$O | 41.275 | 500 | FIG. 13 |

*All examples include 60.0 g urea and 600 mL deionized water unless otherwise indicated.
[‡]39.0 wt % loading Cu$_2$(OH)$_3$(NO$_3$) nanoparticle on silicon alloy B. 20.0 grams silicon alloy B was used.

Summary of XRD Results

FIG. 1 shows the X-ray diffraction pattern of the $MnCO_3$ nanoparticle powder. XRD result indicates that the phases found in FIG. 1 are rhodochrosite $MnCO_3$ (major) and hausmannite $Mn_3O_4$ (trace). It shows $MnCO_3$ nanoparticle can be easily synthesized by this urea assistant preparation method in the water solution.

FIG. 2 shows the X-ray diffraction pattern of the $Zn_5(OH)_6(CO_3)_2$ nanoparticle powder. XRD result indicates that the phases found in FIG. 2 are zinc carbonate hydroxide ($Zn_5(OH)_6(CO_3)_2$, major), zinc carbonate hydroxide hydrate ($Zn_4CO_3(OH)_6 \cdot H_2O$, minor) and/or hydrozincite ($Zn_5(CO_3)_2(OH)_6$, minor) and unidentified phase at a minor level of intensity. It shows $Zn_5(OH)_6(CO_3)_2$ nanoparticle can be easily synthesized by this urea assistant preparation method in the water solution.

FIG. 3 shows the X-ray diffraction pattern of the magnesium containing nanoparticle powder. No known XRD phase of magnesium containing compound can be matched to this new prepared nanoparticle. It indicates that a novel inorganic magnesium compound has been synthesized by this urea assistant inorganic salt hydrolysis technology.

FIG. 4 shows the X-ray diffraction pattern of the cobalt containing nanoparticle powder. No known XRD phase of cobalt containing compound can be matched to this new prepared nanoparticle. It indicates that a novel inorganic cobalt compound has been synthesized by this urea assistant inorganic salt hydrolysis technology.

FIG. 5 shows the X-ray diffraction pattern of the nickel containing nanoparticle powder. No known XRD phase of nickel containing compound can be matched to this new prepared nanoparticle. It indicates that a novel inorganic nickel compound has been synthesized by this urea assistant preparation and coating technology.

FIG. 6 shows the X-ray diffraction pattern of the titanium containing nanoparticle powder. The XRD result indicates that the anatase $TiO_2$ can be synthesized even at 120° C. drying.

FIG. 7 shows the XRD results of PE-7 (39.0 wt % $Cu_2(OH)_3(NO_3)$ coated silicon alloy B). The phase found to be present in the sample was Rouaite [$Cu_2(NO_3)(OH)_3$]. The diffraction maxima at 17.3°, 37.8°, 48.0° and 49.2° (2 theta) were consistent with diffractions of Ferdisilicite ($FeSi_2$).

FIGS. 8-13 show the X-ray diffraction patterns of the prepared metal oxides CuO, NiO, CoO, MgO, ZnO and MnO, respectively. The XRD results indicate that a series of inorganic metal oxide nanoparticles can be synthesized by this urea assistant preparation technology.

Silicon Alloy Materials

The following procedures were used to prepare silicon alloy materials.

Preparative Example 14

(PE-14): Silicon Alloy A Control

Silicon alloy material A was made in accordance with the methods discussed in U.S. Pat. No. 8,071,238, which is hereby incorporated by reference in its entirety. More specifically, the composition that was used for experiments has the formula $Si_{72.68}Fe_{17.08}C_{10.23}$.

Preparative Example 15

(PE-15): Silicon Alloy B Control

Silicon alloy material B was made in accordance with the methods discussed in U.S. Pat. No. 8,071,238, which is hereby incorporated by reference in its entirety. More specifically, the composition that was used for experiments has the formula $Si_{75.42}Fe_{13.89}C_{10.70}$.

Preparative Example 16

(PE-16): Silicon Alloy C Control

Silicon alloy material C was made in accordance with the methods discussed in U.S. Pat. No. 8,753,545, which is hereby incorporated by reference in its entirety. More specifically, the composition that was used for experiments has the formula $Si_{68.49}Fe_{12.60}O_{18.90}$.

Preparative Example 17

(PE-17): Silicon Alloy D Control

Silicon-alloy material D was made in accordance with the methods discussed in U.S. Pat. Appl. No. 2014261899, which is hereby incorporated by reference in its entirety. More specifically, the composition that was used for experiments has the formula $Si_{73.27}Sn_{1.73}Fe_{21.49}C_{3.51}$.

Preparative Example 18

(PE-18): Silicon Alloy E Control

Silicon alloy composite particles having the formula $Si_{75.42}Fe_{13.89}C_{10.70}$ were prepared using procedures disclosed in U.S. Pat. Nos. 8,071,238 and 7,906,238, after which the alloy particles were coated with nano-carbon.

Example Procedures

The following procedures were used to prepare metal based material coated silicon alloy.

Examples 19-44

(E-19-44): Metal Based Material Coated Silicon Alloy B

Metal based material coated silicon alloy anode materials using silicon alloy B were prepared in solution. Using the weights of each precursor provided in Table 3, 30.0 g urea and 600 mL deionized water were mixed in a 1000 mL flask. While stirring, the respective metal hydrate was added to the solution followed by the addition of 20.0 g silicon alloy anode material (silicon alloy B). The solution temperature was increased to 90° C. and was held for 3 h under continuous stirring. The solution was then cooled to room temperature. The coated powders were filtered using a glass microfiber filter and washed with 1000 mL deionized water. The powder was collected and dried in an oven overnight at 120° C. For further metal oxides coating except $TiO_2$, the dried powder was subject to calcination at 500° C. for 4 h under an argon gas atmosphere (see Table 3). $TiO_2$ could be obtained directly after drying at 120° C.

E-19 ($MnCO_3$) and E-20 (MnO) were used for the preparation of Mn based nanoparticle coated silicon alloy B. E-21 ($Zn_5(OH)_6(CO_3)_2$) and E-22 (ZnO) were used for the preparation of Zn based nanoparticle coated silicon alloy B. E-23 (MgO) and E-24 (Mg ion containing nanoparticles) were used for the preparation of Mg based nanoparticle coated silicon alloy B. E-25 (CoO) and E-26 (Co ion containing nanoparticle) were used for the preparation of Co based nanoparticle coated silicon alloy B. E-27 (NiO) and E-28 (Ni ion containing nanoparticle) were used for the preparation of Ni based nanoparticle coated silicon alloy B. E-29-34 (all $Cu_2(OH)_3(NO_3)$) and E-35 (CuO) were used for the preparation of Cu based nanoparticle coated silicon alloy B. E-36 was used for the preparation of $Al_2O_3$ coated silicon alloy B. E-37-44 were used for the preparation of $TiO_2$ coated silicon alloy B. The resulting materials were sieved and subject to further testing.

TABLE 3*

Metal Based Material Coated Silicon Alloy B

| Ex. | Metal Material Precursor | Amount of Metal Material Precursor (g) | Silicon Alloy‡ | Calcination Temp (° C.) | Wt % of Metal Based Coating |
|---|---|---|---|---|---|
| E-19 | $Mn(NO_3)_2 \cdot xH_2O$ | 0.415 | B | — | 1.3 |
| E-20 | $Mn(NO_3)_2 \cdot xH_2O$ | 0.415 | B | 500 | 0.8 |
| E-21 | $Zn(NO_3)_2 \cdot 6H_2O$ | 0.617 | B | — | 1.1 |
| E-22 | $Zn(NO_3)_2 \cdot 6H_2O$ | 0.617 | B | 500 | 0.8 |
| E-23 | $Mg(NO_3)_2 \cdot 6H_2O$ | 0.897 | B | 500 | 0.7 |
| E-24 | $Mg(NO_3)_2 \cdot 6H_2O$ | 0.897 | B | — | — |
| E-25 | $Co(NO_3)_2 \cdot 6H_2O$ | 0.801 | B | 500 | 1 |
| E-26 | $Co(NO_3)_2 \cdot 6H_2O$ | 0.801 | B | — | — |
| E-27 | $Ni(NO_3)_2 \cdot 6H_2O$ | 0.786 | B | 500 | 1 |
| E-28 | $Ni(NO_3)_2 \cdot 6H_2O$ | 0.786 | B | — | — |
| E-29 | $Cu(NO_3)_2 \cdot 3H_2O$ | 0.305 | B | — | 0.74 |
| E-30 | $Cu(NO_3)_2 \cdot 3H_2O$ | 0.614 | B | — | 1.5 |
| E-31 | $Cu(NO_3)_2 \cdot 3H_2O$ | 1.240 | B | — | 3.0 |
| E-32 | $Cu(NO_3)_2 \cdot 3H_2O$ | 1.878 | B | — | 4.5 |
| E-33 | $Cu(NO_3)_2 \cdot 3H_2O$ | 3.196 | B | — | 7.4 |
| E-34 | $Cu(NO_3)_2 \cdot 3H_2O$ | 4.926 | B | — | 10.8 |
| E-35 | $Cu(NO_3)_2 \cdot 3H_2O$ | 0.801 | B | 500 | 3 |
| E-36 | $Al(NO_3)_3$ | 0.751 | B | — | 0.5 |
| E-37 | $TiOSO_4 \cdot 2H_2O$ | 0.249 | B | — | 0.5 |
| E-38 | $TiOSO_4 \cdot 2H_2O$ | 0.501 | B | — | 1.0 |
| E-39 | $TiOSO_4 \cdot 2H_2O$ | 0.755 | B | — | 1.5 |
| E-40 | $TiOSO_4 \cdot 2H_2O$ | 1.012 | B | — | 2.0 |
| E-41 | $TiOSO_4 \cdot 2H_2O$ | 1.271 | B | — | 2.5 |
| E-42 | $TiOSO_4 \cdot 2H_2O$ | 1.533 | B | — | 3.0 |
| E-43 | $TiOSO_4 \cdot 2H_2O$ | 3.101 | B | — | 6.0 |
| E-44 | $TiOSO_4 \cdot 2H_2O$ | 5.507 | B | — | 10.0 |

*All examples include 30.0 g urea and 600 mL deionized water unless otherwise indicated.
‡Amount of silicon alloy used in each example was 20.0 g unless otherwise indicated.

Examples 45-47

(E-45-47): Metal Based Material Coated Silicon Alloy C

Metal based material coated silicon alloy anode materials using silicon alloy C were prepared in a similar fashion according to the procedure outlined in the preparation of metal based material coated silicon alloy B. See Table 4 for the weights of each precursor.

E-45 was used for the preparation of $TiO_2$ coated silicon alloy C. E-46 was used for the preparation of $Cu_2(OH)_3(NO_3)$ coated silicon alloy C. E-47 was used for the preparation of Co ion containing nanoparticle coated silicon alloy C. The resulting materials were sieved and subject to further testing.

TABLE 4*

Metal Based Material Coated Silicon Alloy C

| Ex. | Metal Material Precursor | Amount of Metal Material Precursor (g) | Silicon Alloy‡ | Calcination Temp (° C.) | Wt % of Metal Based Coating |
|---|---|---|---|---|---|
| E-45 | $TiOSO_4 \cdot 2H_2O$ | 1.533 | C | — | 3.0 |
| E-46 | $Cu(NO_3)_2 \cdot 3H_2O$ | 1.878 | C | — | 4.5 |
| E-47 | $Co(NO_3)_2 \cdot 6H_2O$ | 2.451 | C | — | — |

*All examples include 30.0 g urea and 600 mL deionized water unless otherwise indicated.
‡Amount of silicon alloy used in each example was 20.0 g unless otherwise indicated.

Examples 48-51

(E-48-51): Metal Based Material Coated Silicon Alloy D

Metal based material coated silicon alloy anode materials using silicon alloy D were prepared in a similar fashion according to the procedure outlined in the preparation of metal based material coated silicon alloy B. See Table 5 for the weights of each precursor.

E-48 was used for the preparation of $TiO_2$ coated silicon alloy D. E-49 was used for the preparation of $Cu_2(OH)_3(NO_3)$ coated silicon alloy D. E-50 was used for the preparation of Co ion containing nanoparticle coated silicon alloy D. E-51 was used for the preparation of Ni ion containing nanoparticle coated silicon alloy D. The resulting materials were sieved and subject to further testing.

TABLE 5*

Metal Based Material Coated Silicon Alloy D

| Example | Metal Material Precursor | Amount of Metal Material Precursor (g) | Silicon Alloy‡ | Calcination Temp (° C.) | Wt % of Metal Based Coating |
|---|---|---|---|---|---|
| E-48 | $TiOSO_4 \cdot 2H_2O$ | 1.533 | D | — | 3.0 |
| E-49 | $Cu(NO_3)_2 \cdot 3H_2O$ | 1.878 | D | — | 4.5 |
| E-50 | $Co(NO_3)_2 \cdot 6H_2O$ | 2.451 | D | — | — |
| E-51 | $Ni(NO_3)_2 \cdot 6H_2O$ | 2.408 | D | — | — |

*All examples include 30.0 g urea and 600 mL deionized water unless otherwise indicated.
‡Amount of silicon alloy used in each example was 20.0 g unless otherwise indicated.

Examples 52-60

(E-52-60): Metal Based Material Coated Silicon Alloy E

Metal based material coated silicon alloy anode materials using silicon alloy E were prepared in a similar fashion according to the procedure outlined in the preparation of metal based material coated silicon alloy B. See Table 6 for the weights of each precursor and calcination temperatures.

E-52 was used for the preparation of NiO coated silicon alloy E. E-53 was used for the preparation of CuO coated silicon alloy E. E-54 was used for the preparation of CoO coated silicon alloy E. E-55-58 were used for the preparation of $Cu_2(OH)_3(NO_3)$ coated silicon alloy E. E-59 and E-60 were used for the preparation of $TiO_2$ coated silicon alloy E. The resulting materials were sieved and subject to further testing.

TABLE 6*

Metal Based Material Coated Silicon Alloy E

| Example | Metal Material Precursor | Amount of Metal Material Precursor (g) | Silicon Alloy‡ | Calcination Temp (° C.) | Wt % of Metal Based Coating |
|---|---|---|---|---|---|
| E-52 | $Ni(NO_3)_2 \cdot 6H_2O$ | 2.408 | E | 500 | 3 |
| E-53 | $Cu(NO_3)_2 \cdot 3H_2O$ | 6.287 | E | 500 | 2 |
| E-54 | $Co(NO_3)_2 \cdot 6H_2O$ | 2.451 | E | 500 | 3 |
| E-55 | $Cu(NO_3)_2 \cdot 3H_2O$ | 0.614 | E | — | 1.5 |
| E-56 | $Cu(NO_3)_2 \cdot 3H_2O$ | 1.24 | E | — | 3.0 |
| E-57 | $Cu(NO_3)_2 \cdot 3H_2O$ | 1.878 | E | — | 4.5 |
| E-58 | $Cu(NO_3)_2 \cdot 3H_2O$ | 3.196 | E | — | 7.4 |
| E-59 | $TiOSO_4 \cdot 2H_2O$ | 0.501 | E | — | 1.0 |
| E-60 | $TiOSO_4 \cdot 2H_2O$ | 1.533 | E | — | 3.0 |

*All examples include 30.0 g urea and 600 mL deionized water unless otherwise indicated.
‡Amount of silicon alloy used in each example was 20.0 g unless otherwise indicated.

Preparation of Coin Cell Electrodes

A slurry comprising the silicon alloy (coated and uncoated) and lithium polyacrylate (LiPAA) with a 91/9 weight ratio was prepared by placing 1.80 g of a 10% aqueous solution of 250,000 g/mol molecular weight LiPAA and 1.82 g silicon alloy. The slurry was made using a MAZERUSTAR mixer. The mixing time was 12 or 18 minutes. The resulting slurry was then coated onto a 15 μm copper foil using a coating bar with a 0.003" gap and dried under vacuum at 120° C. for 2 h. Coin cell electrodes were then punched from this foil. Electrochemical 2325 coin cells were made with the silicon alloy electrodes versus a lithium foil counter/reference electrode and electrolyte solution (as described in Table 1).

Electrode performance for uncoated (neat) silicon alloy electrodes prepared as described above are tabulated in Tables 15-18 as Comparative Examples 1, 2, 3, and 4 (CE-1-4) for silicon alloys B, C, D, and E, respectively. Electrode performance for metal based material coated silicon alloy electrodes are also tabulated in Tables 15-18 and are labeled with the prefix E added to the example name of the coated silicon alloy used. For example, an electrode prepared using metal based materials coated silicon alloy E-19, would be referred to as EE-19 after it has been incorporated into an electrode.

Preparation of Composite Electrodes

The following procedures were used to prepare metal based material coated silicon alloy electrode compositions.

Examples 61 and 62

(E-61 and E-62): Silicon Alloy A Composite Electrode

Metal based material coated silicon alloy anode materials using silicon alloy A were prepared in a similar fashion according to the procedure outlined in the preparation of metal based material coated silicon alloy B. See Table 7 for the weights of each precursor.

The metal based material coated silicon alloy A was then mixed with, Super P carbon black, a respective graphite composition, LiPAA and deionized water using a MAZERUSTAR mixer for 3 cycles (18 minutes) (Table 8). The resulting slurry was then coated onto a 15 μm copper foil using a coating bar with a 0.006" gap and dried over 2 h in the air. The coatings were further dried under vacuum at 120° C. for 2 h. The final dried coating composition weight ratio of EE-61 1.0 wt % $TiO_2$ coated silicon alloy A/SMG-HE1/KS6/Super P carbon black/LiPAA was 60/15/13/2/10. The final dried coating composition weight ratio of EE-62 0.2 wt % $Al_2O_3$ and 0.5 wt % $TiO_2$ coated silicon alloy A/SMG-HE1/KS6/Super P carbon black/LiPAA was 60/15/13/2/10. Coin cell electrodes were then punched from the foil.

TABLE 7*

Metal Based Material Coated Silicon Alloy A

| Example | Metal Material Precursor | Amount of Metal Material Precursor (g) | Silicon Alloy‡ | Calcination Temp (° C.) | Wt % of Metal Based Coating |
|---|---|---|---|---|---|
| E-61 | $TiOSO_4 \cdot H_2SO_4 \cdot H_2O$ | 0.759 | A | — | 1.0 |
| E-62 | $Al(NO_3)_3 \cdot 9H_2O$ | 0.300 | A | — | 0.2 |
|  | $TiOSO_4 \cdot H_2SO_4 \cdot H_2O$ | 0.380 |  |  | 0.5 |

*All examples include 30.0 g urea and 600 mL deionized water unless otherwise indicated.
‡Amount of silicon alloy used in each example was 20.0 g unless otherwise indicated.

TABLE 8

Silicon Alloy A Composite Electrode Formulations

| Component | EE-61 | EE-62 |
|---|---|---|
| Metal based material coated silicon alloy A (E-XX) | E-61 | E-62 |
| Amount of metal based material coated silicon alloy A (g) | 1.250 | 1.250 |
| SMG-N-HE1 (g) | 0.313 | 0.313 |
| KS6 (g) | 0.271 | 0.271 |
| Super P carbon black (g) | 0.042 | 0.042 |
| LiPAA* (g) | 2.083 | 2.083 |
| Deionized water (g) | 0.250 | 0.250 |

*10% aqueous solution of 250,000 g/mol molecular weight LiPAA and deionized water.

Examples 63-66

(E-63-66): Silicon Alloy B Composite Electrode

Metal based material coated silicon alloy anode materials using silicon alloy B were prepared as previously described. See Table 9 for the weights of each precursor.

The metal based material coated silicon alloy B was then mixed with, Super P carbon black, a respective graphite composition, LiPAA and deionized water using a MAZERUSTAR mixer for 18 min (Table 10). The resulting slurry was then coated onto a 15 μm copper foil using a coating bar with a 0.006″ gap and dried over 2 h in the air. The drying coatings were calendered to 30% porosity according to the calculation. After the calendar, the coatings were further dried under vacuum at 120° C. for 2 h. The final dried coating composition weight ratio for EE-63_65 $Cu_2(OH)_3(NO_3)$ coated silicon alloy B/MAGE/KS6/Super P carbon black/LiPAA was 30/47.5/9.5/3.0/10. The final dried coating composition weight ratio for EE-66 $Cu_2(OH)_3(NO_3)$ coated silicon alloy B/MAGE/KS6/Super P carbon black/LiPAA was 30/50/8/2/10. Coin cell electrodes were then punched from the foil.

TABLE 9*

Metal Based Material Coated Silicon Alloy B

| Example | Metal Material Precursor | Amount of Metal Material Precursor (g) | Silicon Alloy‡ | Calcination Temp (° C.) | Wt % of Metal Based Coating |
|---|---|---|---|---|---|
| E-63 | $Cu(NO_3)_2 \cdot 3H_2O$ | 0.614 | B | — | 1.5 |
| E-64 | $Cu(NO_3)_2 \cdot 3H_2O$ | 1.240 | B | — | 3.0 |
| E-65 | $Cu(NO_3)_2 \cdot 3H_2O$ | 1.878 | B | — | 4.5 |
| E-66 | $Cu(NO_3)_2 \cdot 3H_2O$ | 3.196 | B | — | 7.4 |

*All examples include 30.0 g urea and 600 mL deionized water unless otherwise indicated.
‡Amount of silicon alloy used in each example was 20.0 g unless otherwise indicated.

TABLE 10

Silicon Alloy B Composite Electrode Formulations

| Component | EE-63 | EE-64 | EE-65 | EE-66 |
|---|---|---|---|---|
| Metal based material coated silicon alloy B (E-XX) | E-63 | E-64 | E-65 | E-66 |
| Amount of metal based material coated silicon alloy B (g) | 1.2 | 1.2 | 1.2 | 1.2 |
| MAGE (g) | 1.9 | 1.9 | 2.0 | 1.9 |
| KS6 (g) | 0.38 | 0.38 | 0.32 | 0.38 |
| Super P carbon black (g) | 0.12 | 0.12 | 0.08 | 0.12 |
| LiPAA* (g) | 4.0 | 4.0 | 4.0 | 4.0 |

*10% aqueous solution of 250,000 g/mol molecular weight LiPAA and deionized water.

Example 67

(E-67): Silicon Alloy E Composite Electrode

Metal based material coated silicon alloy anode materials using silicon alloy E were prepared in a similar fashion according to the procedure outlined in the preparation of metal based material coated silicon alloy B. See Table 11 for the weights of each precursor.

The metal based material coated silicon alloy E was then mixed with, a respective graphite composition, LiPAA, and deionized water using a MAZERUSTAR mixer for 18 min (Table 12). The resulting slurry was then coated onto a 15 μm copper foil using a coating bar with a 0.006″ gap and dried over 2 h in the air. The drying coatings were calendered to 30% porosity according to the calculation. After the calendar, the coatings were further dried under vacuum at 120° C. for 2 h. The final dried coating composition ratio for EE-67 4.5 wt % $Cu_2(OH)_3(NO_3)$ coated silicon alloy E/MAGE/KS6/LiPAA was 30/50/10/10. Coin cell electrodes were then punched from the foil.

TABLE 11*

Metal Based Material Coated Silicon Alloy E

| Example | Metal Material Precursor | Amount of Metal Material Precursor (g) | Silicon Alloy‡ | Calcination Temp (° C.) | Wt % of Metal Based Coating |
|---|---|---|---|---|---|
| E-67 | Cu(NO$_3$)$_2$•3H$_2$O | 1.878 | E | — | 4.5 |

*All examples include 30.0 g urea and 600 mL deionized water unless otherwise indicated.
‡Amount of silicon alloy used in each example was 20.0 g unless otherwise indicated.

TABLE 12

Silicon Alloy E Composite Electrode Formulation

| Component | EE-67 |
|---|---|
| Metal based material coated silicon alloy E (E-XX) | E-67 |
| Amount of metal based material coated silicon alloy E (g) | 1.2 |
| MAGE (g) | 2.0 |
| KS6 (g) | 0.4 |
| LiPAA* (g) | 4.0 |

*10% aqueous solution of 250,000 g/mol molecular weight LiPAA in deionized water.

Comparative Examples 5-7

(CE-5-7): Composite Electrode Controls

Electrode composition controls were prepared in solution. Using the weights of each precursor provided in Table 13, a silicon containing alloy material was mixed with a respective graphite composition, LiPAA and deionized water using a MAZERUSTAR mixer for 18 min. The resulting slurry was then coated onto a 15 μm copper foil using a coating bar with a 0.006" gap and dried over 2 h in the air. The drying coatings were calendered to 30% porosity according to the calculation. After the calendar, the coatings were further dried under vacuum at 120° C. for 2 h. For CE-5, the final dried coating composition weight ratio of silicon alloy A/SMG-HE1/KS6/carbon black/LiPAA was 60/15/13/2/10. For CE-6, the final dried coating composition weight ratio of silicon alloy B/MAGE/KS6/carbon black/LiPAA was 30/47.5/9.5/3.0/10. For CE-7, the final dried coating composition weight ratio of silicon alloy E/MAGE/KS6/LiPAA was 30/50/10/10. Coin cell electrodes were then punched from the foil.

TABLE 13*

Electrode Composition Controls

| Component | CE-5 | CE-6 | CE-7 |
|---|---|---|---|
| Silicon alloy A | 1.250 | — | — |
| Silicon alloy B | — | 1.2 | — |
| Silicon alloy E | — | — | 1.2 |
| MAGE | — | 1.9 | 2.0 |
| KS6 | 0.271 | 0.38 | 0.4 |
| SMG-N-HE1 | 0.313 | — | — |
| Super P carbon black | 0.042 | 0.12 | — |
| LiPAA** | 2.083 | 4.0 | 4.0 |
| Deionized water | 0.250 | — | — |

*Amounts of components are in grams unless otherwise indicated.
**10% aqueous solution of 250,000 g/mol molecular weight LiPAA in deionized water.

Electrode Performance Test Methods

The following test methods and procedures were employed in the evaluation of the electrode compositions previously described.

Evaluation of Electrochemical Performance:

Each coin cell electrode (electrode area of 2.01 cm$^2$) typically contained 5 mg to 7 mg of silicon alloy for neat silicon alloy coating, and contained 9 mg to 14 mg of composites of silicon alloy and graphite for composite formulation coating.

Coin half cells were made with the silicon alloy electrodes versus a lithium foil counter/reference electrode and electrolyte solution. Coin half cells were cycled according to the protocol:

1$^{st}$ cycle: Discharge at 0.1 C to 5 mV, trickle to 0.025 C. Rest for 15 minutes. Charge at 0.1 C To 1.5V. Rest for 15 minutes.

2$^{nd}$ cycle through final cycle: Discharge at 0.25 C to 5 mV, trickle to 0.05 C. Rest for 15 minutes. Charge at 0.25 C to 0.9V. Rest for 15 minutes Coin symmetric cells were prepared as follows: One Si alloy containing half-cell (against Li) was first lithiated (half-cell undergoing discharge) at 0.1 C until the cell voltage dropped to 5 mV. The coin cell was disassembled and the lithiated Si electrode was made into a symmetric cell against its identical fresh electrode with the lithiated electrode as the positive electrode. Coin symmetric cells were cycled according to the following protocol:

1$^{st}$ and 2$^{nd}$ cycles: Charge at 0.1 C to 0.9V, trickle to 0.025 C. Rest for 15 minutes. Discharge at 0.1 C to −0.9V, trickle to 0.025 C. Rest for 15 minutes.

3$^{rd}$ cycle through final cycle: Charge at 0.25 C to 0.9V, trickle to 0.05 C. Rest for 15 minutes. Discharge at 0.25 C to −0.9V, trickle to 0.05 C. Rest for 15 minutes.

Summary of Electrochemical Cell Results

Figure 14:
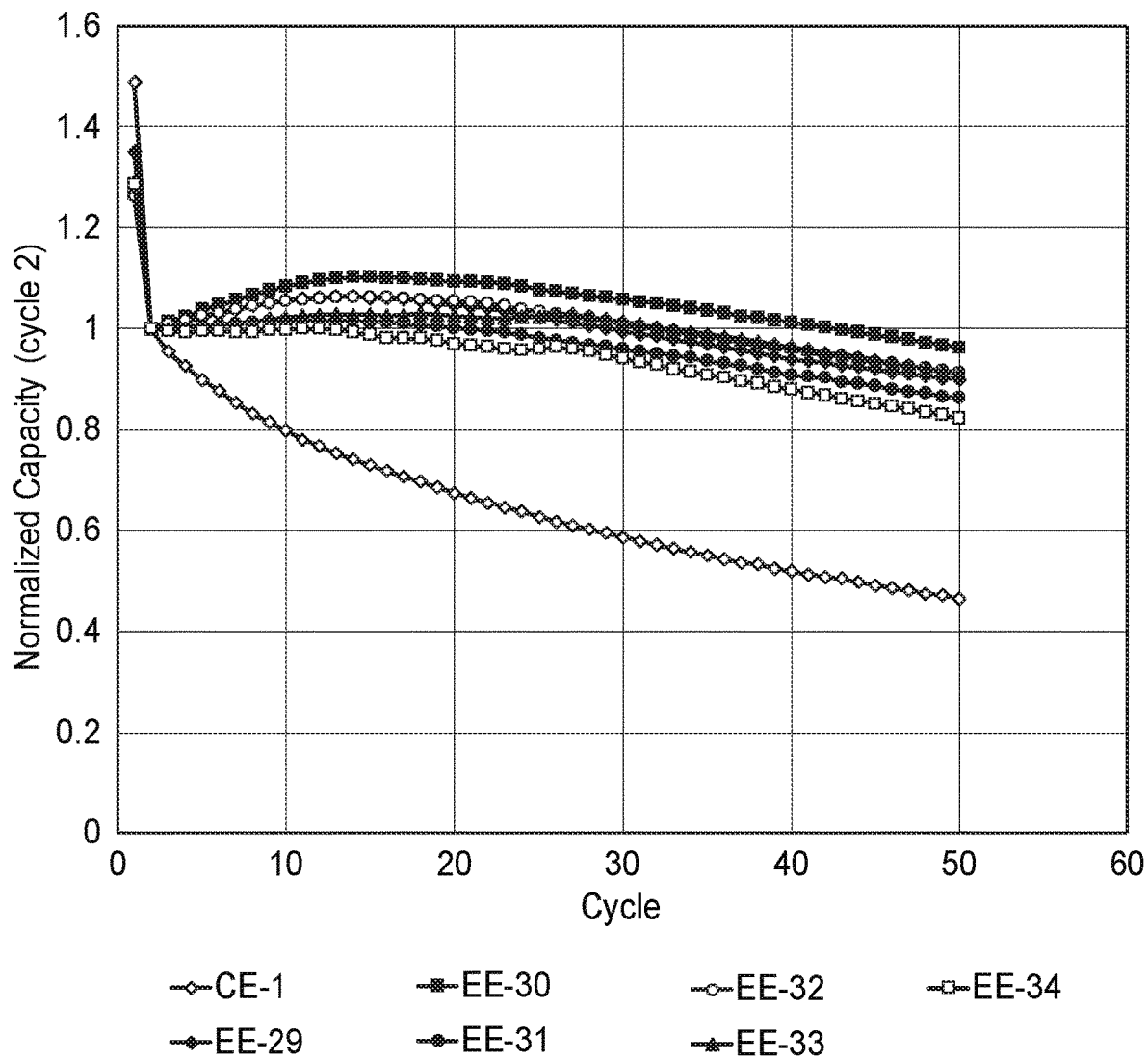
FIG. 14 shows normalized charge capacity as a function of cycling of coin half cells containing metal based material coated silicon alloys of the present disclosure compared to coin half cells containing uncoated silicon alloys.
Figure 15:
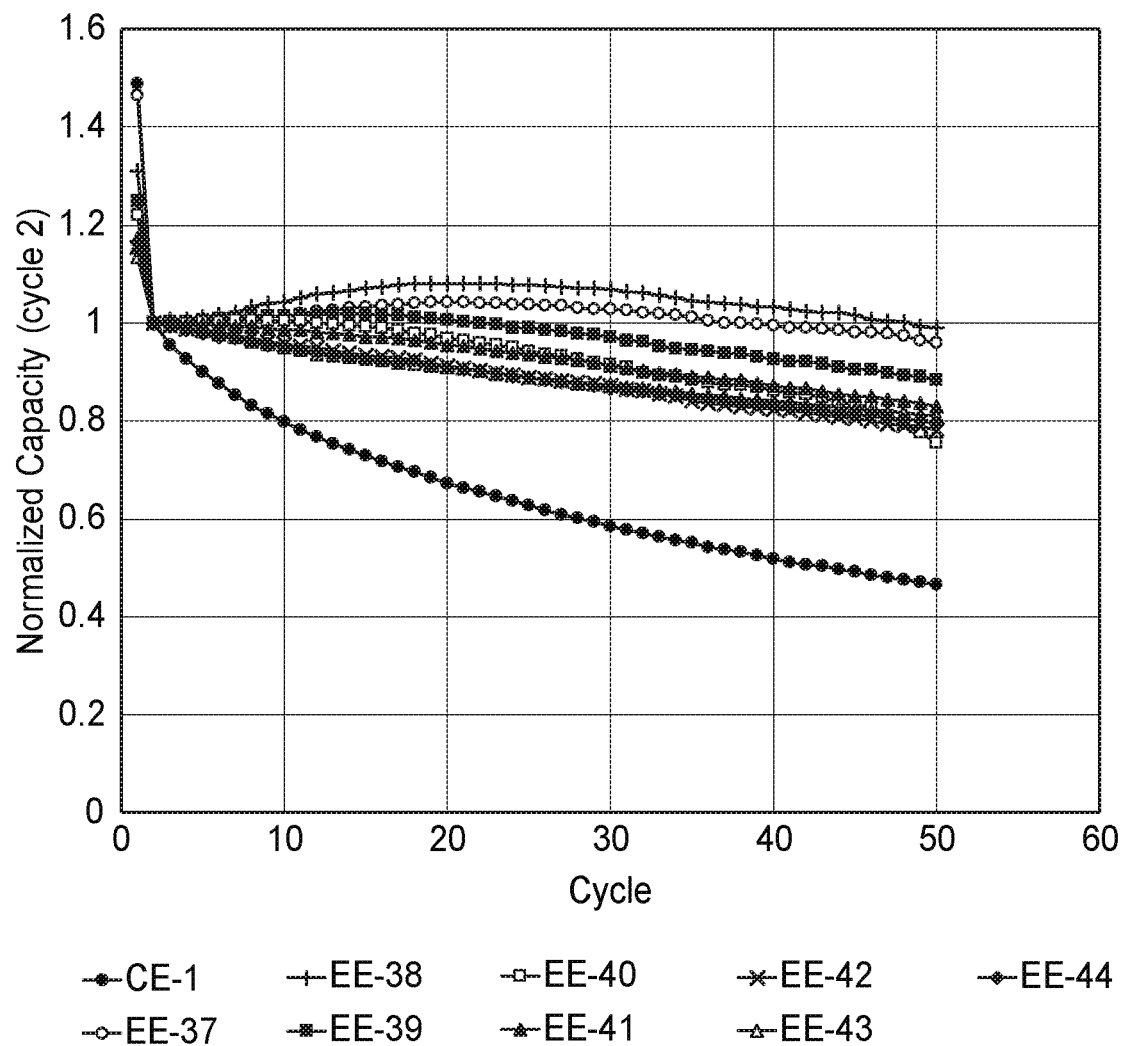
FIG. 15 shows normalized charge capacity as a function of cycling of coin half cells containing metal based material coated silicon alloys of the present disclosure compared to coin half cells containing uncoated silicon alloys.

Cycling results are presented in Tables 14-18 and in FIGS. 14 and 15. Percent capacity retention (% Retention) was calculated as the capacity after the final cycle divided by the second delithiation capacity. Increased Retention is the percent retention of each illustrative example minus the percent retention of the corresponding comparative example.

TABLE 14

Cycling Results of Electrochemical Cells with Silicon Alloy A using coin symmetric cell cycling test

| Ex. | $1^{st}$ Lithiation Capacity | $1^{st}$ Delithiation Capacity | $2^{nd}$ Delithiation Capacity | # of Cycles | Final Delithiation Capacity | % Retention | Increased Retention |
|---|---|---|---|---|---|---|---|
| CE-5 | 747.1 | 665.52 | 655.89 | 110 | 380.55 | 58.02 | |
| EE-61 | 720.40 | 612.81 | 602.44 | 110 | 387.28 | 64.29 | 6.26 |
| EE-62 | 745.97 | 651.38 | 641.13 | 110 | 399.7 | 62.34 | 4.32 |

TABLE 15

Cycling Results of Electrochemical Cells with Silicon Alloy B using half coin cell cycling test

| Ex. | $1^{st}$ Lithiation Capacity | $1^{st}$ Delithiation Capacity | $2^{nd}$ Delithiation Capacity | # of Cycles | Final Delithiation Capacity | % Retention | Increased Retention |
|---|---|---|---|---|---|---|---|
| CE-1 | 1431.59 (discharge) | 1230.52 (charge) | 826.88 | 50 | 384.70 | 46.52 | |
| EE-19 | 1427.25 | 1123.62 | 778.89 | 50 | 642.18 | 82.45 | 35.92 |
| EE-20 | 1333.03 | 1089.99 | 792.25 | 50 | 733.22 | 92.55 | 46.02 |
| EE-21 | 1427.18 | 1195.34 | 927.29 | 50 | 797.87 | 86.04 | 39.52 |
| EE-22 | 1358.82 | 1202.50 | 952.88 | 50 | 596.63 | 62.61 | 16.09 |
| EE-23 | 1325.46 | 1054.05 | 768.60 | 50 | 665.04 | 86.53 | 40.00 |
| EE-25 | 1338.52 | 1135.69 | 831.80 | 50 | 680.59 | 81.82 | 35.30 |
| EE-27 | 1415.44 | 1198.77 | 880.46 | 50 | 772.31 | 87.72 | 41.19 |
| EE-28 | 1511.36 | 1266.86 | 928.86 | 50 | 813.00 | 87.53 | 41.00 |
| EE-29 | 1432.94 | 1252.33 | 926.76 | 50 | 833.35 | 89.92 | 43.40 |
| EE-30 | 1344.04 | 1142.60 | 902.85 | 50 | 869.54 | 96.31 | 49.79 |
| EE-31 | 1424.05 | 1230.66 | 969.61 | 50 | 836.36 | 86.26 | 39.73 |
| EE-32 | 1427.69 | 1217.25 | 965.09 | 50 | 881.15 | 91.30 | 44.78 |
| EE-33 | 1397.32 | 1182.71 | 914.13 | 50 | 831.88 | 91.00 | 44.48 |
| EE-34 | 1389.61 | 1175.64 | 912.95 | 50 | 750.48 | 82.20 | 35.68 |
| EE-35 | 1314.45 | 1170.31 | 854.45 | 50 | 642.91 | 75.24 | 28.72 |
| EE-37 | 1416.81 | 1134.43 | 773.93 | 50 | 743.37 | 96.05 | 49.53 |
| EE-38 | 1421.95 | 1148.68 | 875.61 | 50 | 867.45 | 99.07 | 52.54 |
| EE-39 | 1441.87 | 1230.41 | 984.69 | 50 | 869.63 | 88.32 | 41.79 |
| EE-40 | 1443.28 | 1254.29 | 1026.50 | 50 | 776.02 | 75.60 | 29.07 |
| EE-41 | 1397.08 | 1216.34 | 1036.98 | 50 | 860.35 | 82.97 | 36.44 |
| EE-42 | 1341.18 | 1167.01 | 1010.86 | 50 | 790.44 | 78.19 | 31.67 |
| EE-43 | 1400.24 | 1242.69 | 1094.31 | 50 | 885.98 | 80.96 | 34.44 |
| EE-44 | 1381.24 | 1197.83 | 1042.70 | 50 | 829.33 | 79.54 | 33.01 |
| CE-1 | 1431.59 (discharge) | 1230.52 (charge) | 826.88 | 40 | 428.30 | 51.80 | |
| EE-24 | 1444.77 | 1112.42 | 801.15 | 40 | 766.42 | 95.66 | 43.87 |
| EE-26 | 1395.90 | 1162.88 | 830.49 | 40 | 771.34 | 92.88 | 41.08 |
| CE-1 | 1431.59 (discharge) | 1230.52 (charge) | 826.88 | 25 | 518.10 | 62.66 | |
| EE-36 | 1410.53 | 1179.62 | 764.92 | 25 | 621.73 | 81.28 | 18.62 |
| CE-6 | 778.66 (discharge) | 712.83 (charge) | 665.02 | 90 | 434.33 | 65.31 | |
| EE-63 | 759.33 | 688.79 | 643.39 | 90 | 552.2 | 85.83 | 20.52 |
| EE-64 | 749.28 | 677.67 | 636.9 | 90 | 545.44 | 85.64 | 20.33 |
| EE-65 | 740.77 | 670.38 | 624.71 | 90 | 533.12 | 85.34 | 20.03 |
| EE-66 | 760.86 | 681.68 | 629.68 | 90 | 553.05 | 87.83 | 22.52 |

FIG. 14 shows the results of the normalized charge capacity vs. cycle number for coin half cells containing electrodes made with metal based material coated silicon alloy B: Comparative Example 1 (CE-1; neat silicon alloy B); EE-29 (0.74 wt % $Cu_2(OH)_3(NO_3)$); EE-30 (1.5 wt % $Cu_2(OH)_3(NO_3)$); EE-31 (3.0 wt % $Cu_2(OH)_3(NO_3)$); EE-32 (4.5 wt % $Cu_2(OH)_3(NO_3)$); EE-33 (7.4 wt % $Cu_2(OH)_3(NO_3)$); and EE-34 (10.8 wt % $Cu_2(OH)_3(NO_3)$) using the coin half cell cycling protocols detailed above. The normalized charge capacity upon cycle 2 is plotted for direct comparison of the fade rate in FIG. 14. The results indicate that the normalized charge capacity retention can be increased more than 35.7% with 0.74 wt % $Cu_2(OH)_3(NO_3)$ coating to 10.8 wt % $Cu_2(OH)_3(NO_3)$ coating than that of the control CE-1. In this experiment, the 1.5 wt % $Cu_2(OH)_3(NO_3)$ coating (EE-30) yielded the best capacity retention, which is 49.8% higher in normalized capacity than that of the control CE-1 at the $50^{th}$ cycle.

FIG. 15 shows the results of the normalized charge capacity vs. cycle number for coin half cells containing electrodes made with metal based material coated silicon alloy B: Comparative Example 1 (CE-1; neat silicon alloy B); EE-37 (0.5 wt % $TiO_2$); EE-38 (1.0 wt % $TiO_2$); EE-39 (1.5 wt % $TiO_2$); EE-40 (2.0 wt % $TiO_2$); EE-41 (2.5 wt % $TiO_2$); EE-42 (3.0 wt % $TiO_2$); EE-43 (6.0 wt % $TiO_2$); and EE-44 (10.0 wt % $TiO_2$) using coin half cell cycling protocols detailed previously. The normalized charge capacity upon cycle 2 is plotted in FIG. 15 for direct comparison. The results indicate that the normalized charge capacity retention can be kept at 99.1% for 1.0 wt % $TiO_2$ coated silicon alloy B after 50 cycles running. The normalized charge capacity retention can be increased by 52.6% to 29.1% with 0.5 wt % to 10.0 wt % TiO$_2$ coating than that of the control CE-1. In this experiment, the 1.0 wt % TiO2 coating (EE-38) yielded the best capacity retention, which is 52.6% higher normalized capacity than that of the control CE-1 at the 50$^{th}$ cycle.

TABLE 16

Cycling Results of Electrochemical Cells with Silicon Alloy C using half coin cell cycling test

| Ex. | 1$^{st}$ Lithiation Capacity | 1$^{st}$ Delithiation Capacity | 2$^{nd}$ Delithiation Capacity | # of Cycles | Final Delithiation Capacity | % Retention | Increased Retention |
|---|---|---|---|---|---|---|---|
| CE-2 | 1461.66 (discharge) | 1262.09 (charge) | 1044.26 | 50 | 371.51 | 35.58 | |
| EE-45 | 1503.25 | 1238.15 | 1064.37 | 50 | 908.90 | 85.39 | 49.82 |
| EE-46 | 1401.09 | 1154.86 | 947.59 | 50 | 889.99 | 93.92 | 58.34 |
| EE-47 | 1539.37 | 1177.26 | 854.88 | 50 | 671.90 | 78.60 | 43.02 |

TABLE 17

Cycling Results of Electrochemical Cells with Silicon Alloy D using half coin cell cycling test

| Ex. | 1$^{st}$ Lithiation Capacity | 1$^{st}$ Delithiation Capacity | 2$^{nd}$ Delithiation Capacity | # of Cycles | Final Delithiation Capacity | % Retention | Increased Retention |
|---|---|---|---|---|---|---|---|
| CE-3 | 1283.76 (discharge) | 1181.98 (charge) | 977.36 | 50 | 96.37 | 9.86 | |
| EE-48 | 1282.86 | 1107.45 | 928.94 | 50 | 554.57 | 58.62 | 48.67 |
| EE-49 | 1282.48 | 1119.17 | 879.17 | 50 | 472.41 | 53.73 | 43.87 |
| EE-50 | 1278.74 | 1096.26 | 833.08 | 50 | 554.40 | 66.55 | 56.69 |
| EE-51 | 1326.07 | 1137.31 | 850.61 | 50 | 537.52 | 63.19 | 53.33 |

TABLE 18

Cycling Results of Electrochemical Cells with Silicon Alloy E using half coin cell cycling test

| Ex. | 1$^{st}$ Lithiation Capacity | 1$^{st}$ Delithiation Capacity | 2$^{nd}$ Delithiation Capacity | # of Cycles | Final Delithiation Capacity | % Retention | Increased Retention |
|---|---|---|---|---|---|---|---|
| CE-4 | 1437.15 (discharge) | 1328.61 (charge) | 1190.64 | 50 | 518.52 | 43.55 | |
| EE-52 | 1146.06 | 1141.43 | 1003.23 | 50 | 899.23 | 89.63 | 46.08 |
| EE-53 | 1229.35 | 1191.34 | 1061.12 | 50 | 788.63 | 74.32 | 30.77 |
| EE-54 | 1293.82 | 1100.09 | 951.59 | 50 | 804.88 | 84.58 | 41.03 |
| CE-4 | 1307.14 (discharge) | 1202.06 (charge) | 1074.80 | 50 | 687.31 | 63.95 | |
| EE-59 | 1288.95 | 1142.91 | 1007.52 | 50 | 679.29 | 67.42 | 3.47 |
| EE-60 | 1255.43 | 1110.21 | 993.30 | 50 | 771.01 | 77.62 | 13.67 |
| CE-4 | 1037.22 (discharge) | 1245.59 (charge) | 1128.73 | 100 | 588.16 | 52.11 | |
| EE-55 | 1302.51 | 1182.62 | 1054.50 | 100 | 814.45 | 77.24 | 25.13 |
| EE-56 | 1295.14 | 1163.75 | 1048.17 | 100 | 844.79 | 80.60 | 28.49 |
| EE-57 | 1381.09 | 1241.64 | 1104.54 | 100 | 870.51 | 78.81 | 26.70 |
| EE-58 | 1326.13 | 1172.27 | 1046.60 | 100 | 810.84 | 77.47 | 25.37 |
| CE-7 | 687.15 | 629.97 | 588.99 | 120 | 482.07 | 81.85 | |
| E-67 | 675.37 | 611.48 | 568.7 | 120 | 499.94 | 87.91 | 6.06 |

Although specific embodiments have been illustrated and described herein for purposes of description of some embodiments, it will be appreciated by those of ordinary skill in the art that a wide variety of alternate and/or equivalent implementations may be substituted for the specific embodiments shown and described without departing from the scope of the present disclosure.

What is claimed:

1. An electrochemically negative active material capable of incorporation into an anode, the electrochemically negative active material comprising:

a silicon alloy material comprising an active phase having the formula:

$Si_w M^1_x C_y O_z$, where w, x, y, and z represent atomic % values and w+x+y+z=1;

M$^1$ comprises Sn, Ti, V, Cr, Mn, Fe, Co, Ni, Cu, Zn, Zr, Mg, Al, W, Mo, B, or P; w >0;

x >0; y >0; and z >0; and a metal-based material having the formula:

$M^2_a O_b A_c$, where a, b, and c represent atomic % values and a+b+c=100%;

M$^2$ comprises Si, Ti, Mg, Mn, Co, Ni, Cu or Zn;

A is an anion;

a >0; b >0; and c >0, provided that at least one of b and c is not zero; and wherein the silicon alloy material and the metal-based material contact one another.

2. The electrochemically negative active material according to claim 1, wherein A is an anion comprising a hydroxide, nitrate, carbonate, sulfate, phosphate, acetate, fluoride, chloride, bromide, iodide, $PO_3$, or $P_2O_7$.

3. The electrochemically negative active material according to claim 1, wherein the electrochemically negative active material comprises the silicon alloy material in an amount of between 50 and 99 wt. %, based on the total weight of the electrochemically active material.

4. The electrochemically negative active material according to claim 3, wherein the electrochemically negative active material comprises the metal-based material in an amount of between 0.1 and 20 wt. %, based on the total weight of the electrochemically active material.

5. The electrochemically negative active material according to claim 3, wherein the Scherrer grain size of the active phase of the silicon alloy material is no greater than 50 nanometers.

6. The electrochemically negative active material according to claim 1, wherein the silicon alloy material is present as particles, and wherein the metal-based material is present as a coating disposed on the particles.

7. A negative electrode composition comprising:
the electrochemically active material according to claim 1; and
a binder.

8. A negative electrode composition according to claim 7, further comprising graphite.

9. A negative electrode comprising:
the negative electrode composition according to claim 7; and
a current collector.

10. An electrochemical cell comprising:
the negative electrode of claim 9;
a positive electrode comprising a positive electrode composition comprising lithium; and
an electrolyte comprising lithium.

11. An electronic device comprising the electrochemical cell according to claim 10.

12. A method of making an electrochemical cell, the method comprising:
providing a positive electrode comprising a positive electrode composition comprising lithium;
providing a negative electrode according to claim 9;
providing an electrolyte comprising lithium; and
incorporating the positive electrode, negative electrode, and the electrolyte into an electrochemical cell.

* * * * *